(12) United States Patent
Venneri et al.

(10) Patent No.: US 11,417,437 B2
(45) Date of Patent: Aug. 16, 2022

(54) VARIABLE PROPELLANT DENSITY FOR PASSIVE REACTIVITY CONTROL OF NUCLEAR THERMAL PROPULSION REACTORS

(71) Applicant: ULTRA SAFE NUCLEAR CORPORATION, Seattle, WA (US)

(72) Inventors: Paolo Francesco Venneri, Seattle, WA (US); Michael John Eades, Seattle, WA (US)

(73) Assignee: Ultra Safe Nuclear Corporation, Seattle, WA (US)

( * ) Notice: Subject to any disclaimer, the term of this patent is extended or adjusted under 35 U.S.C. 154(b) by 88 days.

(21) Appl. No.: 16/818,320

(22) Filed: Mar. 13, 2020

(65) Prior Publication Data

US 2020/0273588 A1 Aug. 27, 2020

Related U.S. Application Data

(62) Division of application No. 15/457,030, filed on Mar. 13, 2017, now Pat. No. 10,643,754.
(Continued)

(51) Int. Cl.
*G21D 5/02* (2006.01)
*B64G 1/40* (2006.01)
(Continued)

(52) U.S. Cl.
CPC .............. *G21D 5/02* (2013.01); *B64G 1/408* (2013.01); *G21C 5/02* (2013.01); *G21C 15/08* (2013.01);
(Continued)

(58) Field of Classification Search
CPC ........... G21D 5/02; B64G 1/408; B64G 1/409
See application file for complete search history.

(56) References Cited

U.S. PATENT DOCUMENTS 3,168,807 A * 2/1965 Ledwith .................. G21D 5/02
376/318
3,362,813 A 1/1968 Ziolkowski
(Continued)

OTHER PUBLICATIONS

Hydes. "Hydraulic Valve Installation." Modern Industrial Hydraulics, Jan. 30, 2015, http://www.modernhydraulics.net/tag/bleed-off-circuit. (Year: 2015).*
(Continued)

*Primary Examiner* — Sharon M Davis
(74) *Attorney, Agent, or Firm* — RatnerPrestia

(57) ABSTRACT

Passive reactivity control technologies that enable reactivity control of a nuclear thermal propulsion (NTP) system with little to no active mechanical movement of circumferential control drums. By minimizing or eliminating the need for mechanical movement of the circumferential control drums during an NTP burn, the reactivity control technologies simplify controlling an NTP reactor and increase the overall performance of the NTP system. The reactivity control technologies mitigate and counteract the effects of xenon, the dominant fission product contributing to reactivity transients. Examples of reactivity control technologies include, employing burnable neutron poisons, tuning hydrogen pressure, adjusting wait time between burn cycles or merging burn cycles, and enhancement of temperature feedback mechanisms. The reactivity control technologies are applicable to low-enriched uranium NTP systems, including graphite composite fueled and tungsten ceramic and metal matrix (CERMET), or any moderated NTP system, such as highly-enriched uranium graphite composite NTP systems.

20 Claims, 19 Drawing Sheets

Related U.S. Application Data

(60) Provisional application No. 62/308,188, filed on Mar. 14, 2016, provisional application No. 62/308,191, filed on Mar. 14, 2016.

(51) Int. Cl.
  *G21C 5/02* (2006.01)
  *G21C 15/08* (2006.01)
  *G21C 3/62* (2006.01)
  *G21C 3/38* (2006.01)
  *G21C 15/06* (2006.01)
  *G21C 3/64* (2006.01)
  *G21C 7/04* (2006.01)

(52) U.S. Cl.
  CPC .............. *G21C 3/38* (2013.01); *G21C 3/62* (2013.01); *G21C 3/64* (2013.01); *G21C 7/04* (2013.01); *G21C 15/06* (2013.01); *Y02E 30/30* (2013.01)

(56) References Cited

U.S. PATENT DOCUMENTS

| | | | |
|---|---|---|---|
| 3,607,642 A | 9/1971 | Murdock | |
| 3,615,369 A | 10/1971 | Francis | |
| 3,778,344 A | 12/1973 | Walsh | |
| 4,113,563 A | 9/1978 | Tobin | |
| 5,241,571 A | 8/1993 | Pati et al. | |
| 5,289,512 A | 2/1994 | Pettus | |
| 5,410,578 A | 4/1995 | Walton | |
| 5,475,722 A | 12/1995 | Culver | |
| 6,730,180 B1 | 5/2004 | Mizia et al. | |

OTHER PUBLICATIONS

Hydes. "Hydraulic Valve Installation." Modern Industrial Hydraulics, Jan. 30, 2015, http://www.modernhydraulics.net/category/hydraulic-basics. (Year: 2015).*

Benensky, K., et al., "Development of a Prototypic Tie-tube for a Low Enriched Uranium (LEU) Nuclear Thermal Rocket (NTR),"2015 Nuclear and Emerging Technologies for Space Conference, Albuquerque, NM Feb. 23-25, 2015, 89 pages.

Houts, M.G., et al., "Nuclear Thermal Propulsion for Advanced Space Exploration," May 7, 2012, Conference Paper, NASA Technical Reports Server (NTRS), Space Propulsion 2012, May 7-10, 2012, Bordeaux, France, 28 pages.

Fittje, J.E., et al., "Revised Point of Departure Design Options for Nuclear Thermal Propulsion," Feb. 23, 2015, Oral/Visual Presentation, NASA Technical Reports server (NTRS), Nuclear and Emerging Technologies for Space (NETS 2015); Feb. 23-26, 2015, Albuquerque, NM, 35 pages.

Gomez, C.F., et al., A Multi-Dimensional Heat Transfer Model of a Tie-Tube and Hexogonal Fuel Element for Nuclear Thermal Propulsion, Feb. 22, 2016, Oral/Visual Presentation, NASA Technical Server (NTRS), Nuclear and Emerging Technologies for Space (NETS) 2016, Feb. 22-25, 2016, Huntsville, AL, 21 pages.

Houts, M.G., et al., "The NASA Advanced Exploration Systems Nuclear Thermal Propulsion Project," Jul. 27, 2015, Conference Paper, NASA Technical Reports Server (NTRS), AIAA/SAE/ASEE Joint Propulsion Conference, 51st, Jul. 27-29, 2015, Orlando, FL, 9 pages.

Houts, M.G., et al., "NASA's Nuclear Thermal Propulsion Project," Jul. 27, 2015, Technical Report, NASA Technical Reports Server (NTRS), 2017, AIAA/SAE/ASEE Joint Propulsion Conference, 51st, Jul. 27-29, 2015, Orlando, FL, 11 pages.

Fittje, J.E., "Upgrades to the NESS (Nuclear Engine System Simulation) Code," Jul. 7, 2007, Conference Paper, NASA Technical Reports Server (NTRS), 43rd AIAA/ASME/ASEE Joint Propulsion Conference & Exhibit; Jul. 8-11, 2007, Ohio, 12 pages.

Advanced Zirconium Carbide Tie-Tubes for NTP, Phase 1 Project, Completed Project (2015-2015), SBIR/STTR Programs, Space Technology Mission Directorate (STMD), TechPort, techport.nasa.gov, printed Feb. 23, 2017, 3 pages.

Marshall Space Center, "Burnable-Poison-Operated Reactor Using Gadolinium Loaded Alloy" retrieved at https://www.techbriefs.com/component/content/article/tb/techbriefs/propulsion/24845, Jun. 1, 2016, 1 page.

International Search Report and Written Opinion for International Application No. PCT/US2017/022165, dated Jan. 18, 2018, 7 pages.

International Preliminary Report on Patentability and Written Opinion for International Application No. PCT/US2017/022165, dated Jan. 18, 2918, 5 pages.

Venneri Paolo Francesco, "A Physics and Conceptual Study on LEU-Loaded Nuclear Thermal Propulsion Reactors", Ph.D. Dissertation, Korea Advanced Institute of Science and Technology, 2017, 87 pages.

Judd Sam et al., "Experimentally Verifying the Effectiveness of Fueled Control Drums", Nuclear and Emerging Technologies for Space, American Nuclear Society Topical Meeting, Richland, WA, Feb. 25-28, 2019, pp. 1-3.

Shimoda Kazuya et al., "Processing of Inert SIC Matrix with Triso Coated Fuel by Liquid Phase Sintering", Ceramic Direct Materials for Energy Application II, Nov. 19, 2012, pp. 25-28 and 31.

American Nuclear Society, "Nuclear and Emerging Technologies for Space (NETS-2018)", Feb. 26-Mar. 1, 2018, Presented at Palace Station Hotel & Casino, Las Vegas NV, pp. 1-54.

Eades Michael J., "Xe in LEU Cermet Nuclear Thermal Propulsion Systems", Dissertation, The Ohio State University, 2016, pp. 1-149.

Venneri Paul et al., "Serpent Neuronic Calculations of Nuclear Thermal Propulsion Reactors", presented at 6th International Serpent User Group Meeting, Milano, Italy, Sep. 26-29, 2016, pp. 1-33.

Eades Michael et al., "SCCTE: An LEU NTP Concept with Tungsten Cermet Fuel", Transactions of the American Nuclear Society, vol. 113, Washington, D C., Nov. 8-12, 2015, pp. 1-5.

Venneri Paolo et al, "Advancements in the Development of Low Enriched Uranium Nuclear Thermal Rockets", Science Direct, Energy Procedia 131 (2017), pp. 53-60.

Venneri Paolo et al., A Point Design for a LEU Composite NTP System: Superb Use of Low Enriched Uranium (SULEU), Proceedings of Nuclear & Emerging Technologies for Space, (NETS) 2016, Huntsville AL., Feb. 22-25, 2016, pp. 139-146.

NASA Proceedings of Nuclear & Emerging Technologies for Space (NETS), 2015, Albuquerque, NM.

"Inconel." Wikipedia: The Free Encyclopedia, May 20, 2019, https://en.wikipedia.org/wiki/inconel (Year 2019).

"Inconel Alloy 718" Special Metals, http://www.specialmetals.com/tech-center/alloys.html, Sep. 2007. (Year 2007).

"Reactor Grade Zirconium" ATI Technical Data Sheet, https://www.atimetals.com/Products/Documents/datasheets/zirconium/alloy/Zr_nuke_waste_disposal_v1.pdf, Feb. 15, 2015. (Year: 2015).

* cited by examiner

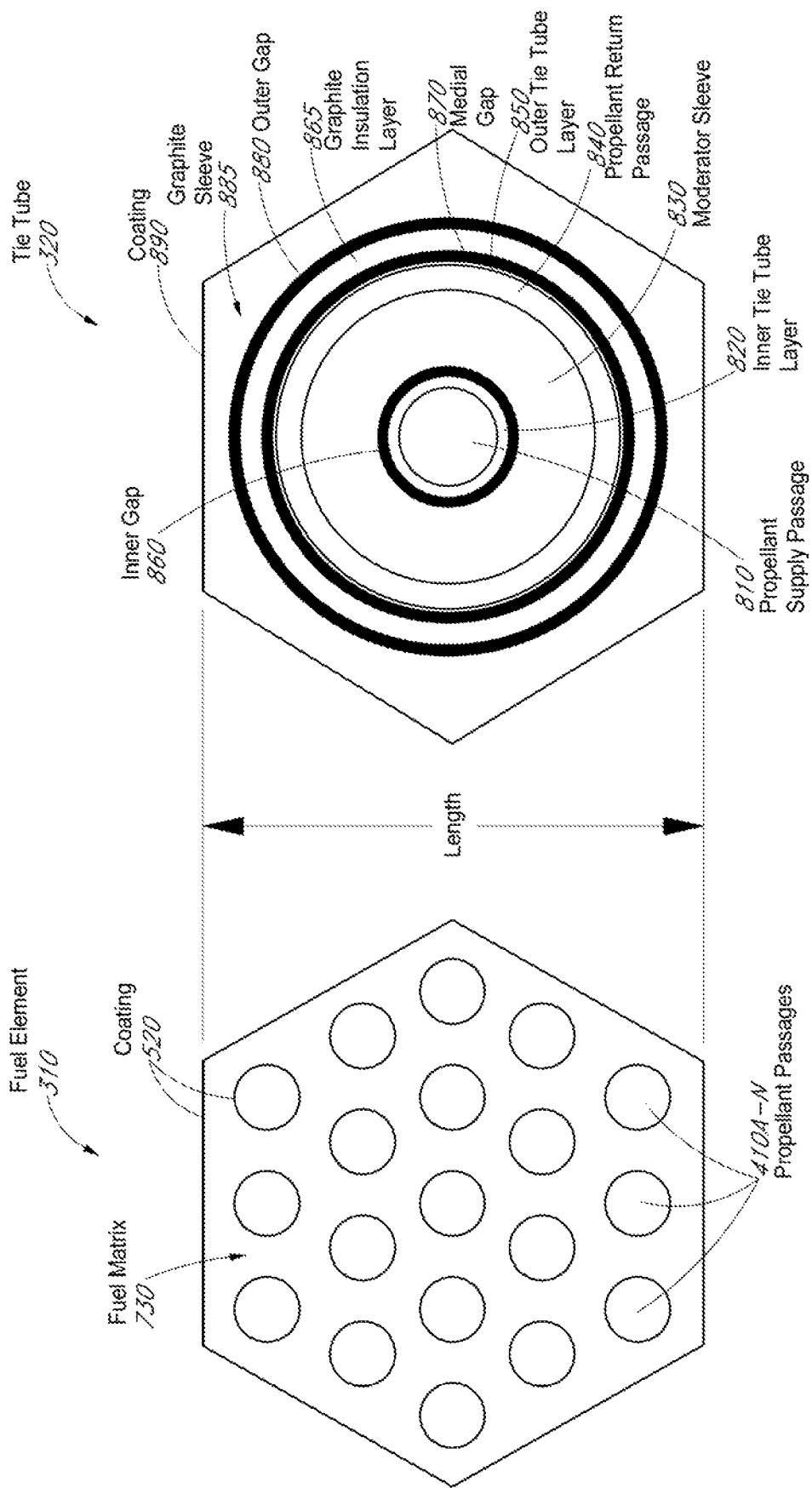

910 920

Baseline Core Configuration Summaries

| Superb Use of Low Enriched Uranium (SULEU) | | | | Space Capable Cryogenic Thermal Engine (SCCTE) | | | |
|---|---|---|---|---|---|---|---|
| SULEU is a Graphite Composite Fuel, $ZrH_{1.8}$ moderated LEU nuclear thermal propulsion concept relying largely on heritage design. | | | | SCCTE is a LEU W-UO2, $ZrH_{1.8}$ moderated LEU nuclear thermal propulsion. | | | |
| Reactor System Mass | | | | Reactor System Mass | | | |
| Fuel Mass (600 Elements) (kg) | | | 800.1 | Fuel Mass (151 Elements) (kg) | | | 1029.8 |
| Tie Tubes (427 Elements) (kg) | | | 588.6 | Tie Tubes (150 Elements) (kg) | | | 700.4 |
| Radial Reflector + Control Drums (kg) | | | 757.4 | Radial Reflector + Control Drums (kg) | | | 618.6 |
| Axial Reflector (kg) | | | 86.7 | Axial Reflector (kg) | | | 61.5 |
| Core Structure (kg) | | | 265.2 | Core Structure (kg) | | | 285.2 |
| Total Mass (Excluding Shield) (kg) | | | 2498.0 | Total Mass (Excluding Shield) (kg) | | | 2557.6 |
| Key Performance Parameters | | | | Key Performance Parameters | | | |
| Nominal Isp (150:1 Nozzle) | | | 897.9 | Nominal Isp (150:1 Nozzle) | | | 894 |
| Nominal Thrust (kN) | | | 155.7 (35k lbf) | Nominal Thrust (kN) | | | 157.3 (~35k lbf) |
| Whole Reactor Power (MW) | | | 768.9 | Whole Reactor Power (MW) | | | 765.3 |
| Fuel Temperature Max (K) | | | 2850 | Fuel Temperature Max (K) | | | 2850 |
| Engine System Interface Information | | | | Engine System Interface Information | | | |
| Interface Point | Flow Rate (kg/s) | Pressure (MPa) | Temp. (K) | Interface Point | Flow Rate (kg/s) | Pressure (MPa) | Temp. (K) |
| Core inlet | 17.68 | 8 | 300.0 | Core inlet | 17.76 | 6.93 | 291 |
| Core outlet | 17.68 | 5 | 2712.8 | Core outlet | 17.76 | 4.72 | 2694 |
| Fuel Details | | | | Fuel Details | | | |
| Fuel Composition | | | (U, Zr)C | Fuel Composition | | | W-UO2-ThO2 |
| Carbide Fraction (% vol) | | | 35 | Volume Loading of Oxide (%vol.) | | | 60 |
| Uranium Loading (g/cm³) | | | 0.64 | ThO2 in the Oxide (%mol) | | | 6.0 |
| Enrichment of $^{235}U$ (% atom) | | | 19.75 | Enrichment of $^{235}U$ (% atom) | | | 13.13 to 19.75 |
| Total $^{235}U$ (kg) | | | 18.1 | Total $^{235}U$ (kg) | | | 45.9 |
| Fuel Cladding | | | ZrC | Fuel Coating | | | W |

FIG. 9

| Reactivity coefficients for the SULEU and SCCTE | | |
|---|---|---|
| Reactivity Coefficient | SULEU | SCCTE |
| Moderator Temperature ($/K) | -0.0045 | -0.00084 |
| Fuel Temperature ($/K) | -0.0032 | -0.0021 |
| Tie-Tube Hydrogen Density ($/% change) | 0.0260 | 0.0070 |

FIG. 21

VARIABLE PROPELLANT DENSITY FOR PASSIVE REACTIVITY CONTROL OF NUCLEAR THERMAL PROPULSION REACTORS

CROSS-REFERENCE TO RELATED APPLICATIONS

This is a Divisional Application of U.S. patent application Ser. No. 15/457,030, filed Mar. 13, 2017, now U.S. Pat. No. 10,643,754, issued May 5, 2020, which claims priority to U.S. Provisional Patent Application No. 62/308,188, filed on Mar. 14, 2016, titled "Burnable poison operated reactor using gadolinium loaded alloy for nuclear thermal propulsion passive reactivity control"; and U.S. Provisional Patent Application No. 62/308,191, filed on Mar. 14, 2016, titled "Hydrogen pressure operated system for passive reactivity adjustment," the entire disclosures of which are incorporated by reference herein.

STATEMENT REGARDING FEDERALLY SPONSORED RESEARCH OR DEVELOPMENT

This invention was made with government support under Contract No. SBIR 2015-I NNX15CC62P awarded by the National Aeronautics and Space Administration (NASA). The government has certain rights in the invention.

TECHNICAL FIELD

The present subject matter relates to examples of nuclear thermal propulsion systems and nuclear reactor systems. The present subject matter also encompasses passive reactivity control of nuclear thermal propulsion reactors.

BACKGROUND

Conventional chemical based propulsion systems commonly deployed in rockets rely on an oxidizer, such as oxygen, to generate a chemical reaction in order to create thrust. Nuclear thermal propulsion (NTP) systems have the potential to deliver thrust values that far exceed chemical based fuels. Typically, this is done by heating a propellant, typically low molecular weight hydrogen, to over 2,6000 Kelvin by harnessing thermal energy from a nuclear reactor.

NTP is an appealing technology with prospects for becoming the propulsion system of choice for human missions beyond low earth orbit. Numerous mission architectures call NTP the preferred approach for a 2030s human Mars mission for its ability to produce significant amounts of thrust while operating at a high specific impulse.

The design of NTP systems dates back to the Nuclear Engine for Rocket Vehicle Applications (NERVA) work done by NASA. The NERVA design typically consists of a small nuclear fission reactor, turbopump assembly (TPA), nozzle, radiation shield, assorted propellant lines, pressure vessel, and support hardware. Thermal energy gained by the propellant during an expansion cycle is used to power the rocket.

In conventional NTP designs, control drums are used to adjust reactor reactivity. Unfortunately, reactivity control of NTP reactors through the use of the control drums can be problematic in terms of operating requirements and effect on the performance of the propulsion system.

SUMMARY

Hence, there is room for further improvement in NTP systems and devices that incorporate such NTP systems. The passive control technologies disclosed herein simplify the control of an NTP system and improve the overall performance during operation. With some of the passive control technologies, little to no active mechanical movement of circumferential control drums will be required for the majority of NTP operation.

The passive control technologies mitigate the effect of the build-up of $^{135}$Xe, a powerful neutron poison, during operation. While the technologies disclosed are utilized with low-enriched uranium (LEU) NTP systems (e.g., graphite composite fuel and tungsten (W) CERMET fuel), the technologies have application to any moderated NTP system, including highly-enriched uranium (HEU) graphite composite fueled NTP reactor systems. An LEU system has 20% or lower $^{235}$U. A ceramic and metal matrix (CERMET) fuel can include (U, PuO$_2$), (enriched U, UO$_2$), or other fuels.

In an example, a nuclear thermal propulsion system comprises a nuclear reactor core. The nuclear reactor core includes an array of fuel elements and an array of tie tubes adjacent the array of fuel elements. Each tie tube includes a propellant supply passage to flow a propellant, an inner tie tube layer surrounding the propellant supply passage, a moderator sleeve surrounding the inner tie tube layer, a propellant return passage surrounding the moderator sleeve, and an outer tie tube layer surrounding the propellant return passage.

A burnable poison can be dispersed in the nuclear reactor core. For example, the burnable poison is dispersed in the array of fuel elements or the array of tie tubes. The burnable poison can include Gadolinium (Gd). The Gd can be dispersed in an alloy that forms the outer tie tube layer. The propellant can be hydrogen. The Gd dispersed in the outer tie tube layer alloy can be in a quantity greater than 0 parts per million (ppm) and less than one-thousand (1,000) ppm. The Gd in the outer tie tube layer alloy can be a natural isotopic composition or an enriched $^{157}$Gd isotope. The outer tie tube layer alloy can further include nickel, chromium, and iron. The outer tie tube layer alloy can further include molybdenum, niobium, cobalt, manganese, copper, aluminum, titanium, silicon, carbon, sulfur, phosphorus, and boron. The outer tie tube layer alloy can also be formed of zirconium or zirconium carbide.

The array of fuel elements can include a graphite composite fuel formed of low-enriched uranium (LEU) having 20% or lower $^{235}$U. The array of fuel elements can include a tungsten ceramic and metal matrix (CERMET) fuel formed of low-enriched uranium (LEU) having 20% or lower $^{235}$U. The moderator sleeve can include a solid hydride. The Gd dispersed in the outer tie tube layer alloy can be in a quantity of 20 parts per million (ppm) to 200 ppm.

Each tie tube can further comprise an inner gap between the inner tie tube layer and the moderator sleeve, a graphite insulation layer surrounding the outer tie tube layer, a medial gap between the outer tie tube layer and the graphite insulation layer, an outer gap surrounding the graphite insulation layer, a graphite sleeve surrounding the outer gap, and a coating formed of zirconium carbide or niobium carbide surrounding the graphite sleeve. The graphite insulation layer can include zirconium carbide (ZrC), titanium carbide, silicon carbide, tantalum carbide, hafnium carbide, ZrC—ZrB$_2$ composite, or ZrC—ZrB$_2$—SiC composite.

The propellant supply passage, the inner tie tube layer, the moderator sleeve, the propellant return passage, and the outer tie tube layer can be radially arranged. A respective radial wall thickness of the outer tie tube layer can be less than the inner tie tube layer. The array of fuel elements can be interspersed with the array of tie tubes and each of the tie tubes can be in direct or indirect contact with at least one fuel element. A plurality of circumferential control drums can surround the array of fuel elements and the array of tie tubes to change reactivity of the nuclear reactor core.

In one example, the burnable poison can include Gadolinium (Gd) and the Gd can be dispersed in an alloy that forms the inner tie tube layer. In on example, the burnable poison can include Gadolinium (Gd) and the Gd can be dispersed in each of the fuel elements. In one example, the moderator sleeve can be formed of zirconium hydride and the burnable poison can include Gadolinium (Gd). The Gd can be dispersed in the zirconium hydride that forms the moderator sleeve.

In one example, the nuclear reactor core can further comprise at least one wire formed of an alloy that is housed inside the nuclear reactor core and separate from the array of fuel elements and the array of tie tubes. The burnable poison can include Gadolinium (Gd). The Gd can be dispersed in the at least one alloy wire.

The nuclear thermal propulsion system can further comprise a propellant tank to store the propellant, a nuclear reactor core inlet directly or indirectly connected to the nuclear reactor core, and a propellant line directly or indirectly connected to the propellant tank to flow the propellant to the nuclear reactor core inlet. The nuclear thermal propulsion system can further comprise a propellant density control valve system directly or indirectly connected between the propellant line and the nuclear reactor core inlet to regulate density of the propellant flowing into the nuclear reactor core.

The nuclear thermal propulsion system can further comprise a turbopump assembly comprising at least one turbopump that includes a turbine and a pump. The pump can be configured to cool the nuclear reactor core during a burn cycle by flowing the propellant from the propellant tank through the propellant line to the propellant density control valve system, and then through the nuclear reactor core inlet.

The nuclear reactor core inlet can include a tie tube inlet to flow the propellant to the array of tie tubes and can be directly or indirectly connected to the propellant density control valve system and a respective propellant supply passage of a respective tie tube in the array of tie tubes. The pump can be further configured to flow the propellant through the tie tube inlet, through the respective propellant supply passage of the respective tie tube in the array of tie tubes, and then through a respective propellant return passage of the respective tie tube.

The nuclear thermal propulsion system can further comprise a propellant heating line directly or indirectly connected to the turbine and the respective propellant return passage of the respective tie tube and a second propellant density control valve system directly or indirectly connected to the turbine and the nuclear reactor core inlet to regulate density of the propellant flowing back to the nuclear reactor core inlet. The pump can be configured to flow the propellant returned by the respective propellant return passage to the turbine via the propellant heating line. The turbine can be configured to flow the propellant back to the second propellant density control valve system and the nuclear reactor core inlet.

The nuclear reactor core inlet can further include a fuel element inlet to flow the propellant to the array of fuel elements and can be directly or indirectly connected to the second propellant density control valve system and a respective propellant passage of a respective fuel element of the array of fuel elements. The turbine can be configured to flow the propellant to the second propellant density control valve system, through the fuel element inlet, and then through the respective propellant passage of the respective fuel element of the array of fuel elements.

The nuclear thermal propulsion system can further comprise a pressure vessel housing the nuclear reactor core that can be directly or indirectly connected to the propellant density control valve system. The pressure vessel can include a pressure vessel inlet connected to the periphery of the pressure vessel that is outside of the nuclear reactor core and a pressure vessel outlet to return the propellant passing through the periphery of the pressure vessel. The nuclear thermal propulsion system can further comprise a propellant heating line directly or indirectly connected to the turbine and the pressure vessel outlet. The pump can be further configured to flow the propellant to the pressure vessel inlet, through the periphery of the pressure vessel, and then flow the returned propellant from the pressure vessel outlet to the turbine via the propellant heating line.

The nuclear thermal propulsion system can further comprise a nozzle, a plurality of control drums, a neutron reflector, and a second propellant density control valve system. The second propellant density control valve system can be directly or indirectly connected between the propellant line and the pressure vessel inlet to regulate density of the propellant flowing into the nozzle, the periphery of the pressure vessel, the neutron reflector, and the plurality of control drums.

The propellant density control valve system can include a regulator valve to adjust density of the propellant passing through the regulator valve from an initial density when entering the regulator valve to a regulated density when exiting the regulator valve. The propellant density control valve system can also include an actuator to actuate the regulator valve by adjusting the regulated propellant density upwards during each subsequent burn cycle to maintain constant reactivity at a beginning of each of the subsequent burn cycles. The actuator can be electric, mechanical, thermal, magnetic, or a combination thereof.

The propellant density control valve system can further include a flow control circuit to control speed of the actuator. The flow control circuit can be a bleed-off circuit, a meter-out circuit, or a meter-in circuit.

The regulator valve and the actuator can form a solenoid valve or an electrohydraulic servovalve. The regulator valve and the actuator can form the solenoid valve and the solenoid valve can be controlled by electric signals conveyed from an external computer, a digital circuit, an analog circuit, or a combination thereof.

The propellant can be hydrogen and the regulator valve can be configured to adjust density of the hydrogen from the initial density to the regulated density by varying pressure between 100% and 200% of nominal hydrogen pressure, inclusive, to increase reactivity of the nuclear reactor core. The nominal hydrogen pressure can be 5 to 15 megapascals (MPa).

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 7 is a cross-sectional view of the fuel element of FIGS. 4 and 5.

FIG. 8 is a cross-sectional view of the tie tube of FIGS. 4 and 6 that depicts inner and outer tie tube layers and other layers of the tie tube.

FIG. 9 is a table of two reference nuclear reactor core designs, each using a different type of nuclear fuel, Superb Use of Low Enriched Uranium (SULEU) (using a carbide graphite composite fuel) and Space Capable Cryogenic Thermal Engine (SCCTE) (using a tungsten cermet fuel) that includes configuration and performance details.

FIG. 21 is a table of reactivity coefficients for SULEU and SCCTE.

DETAILED DESCRIPTION

Figure 1:
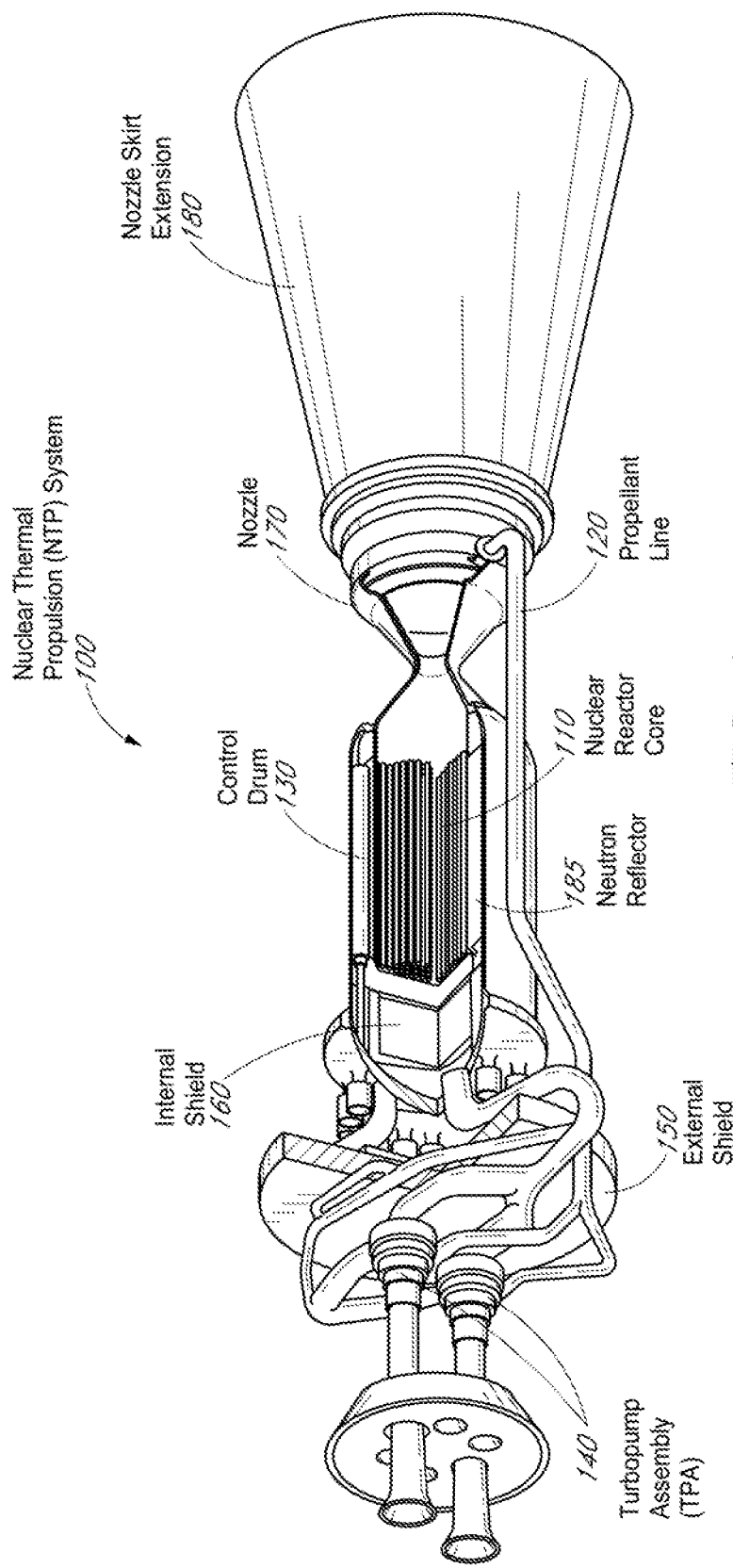
FIG. 1 is an illustration of a nuclear thermal propulsion system that depicts an internal nuclear reactor core, a propellant line, a control drum, and other components of the assembly.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to passive control technologies that enable criticality control of a nuclear thermal propulsion (NTP) system with little to no active mechanical movement of circumferential control drums. By minimizing or eliminating the need for active mechanical movement of the circumferential control drums during an NTP burn, the passive control technologies simplify controlling an NTP reactor core and increase the overall performance of the NTP system. Moreover, each of the four passive control technologies are generally compatible with existing design requirements of an NTP system.

A first passive control technology includes employing burnable neutron poisons, such as Gd, B-10, and Cd, in the nuclear reactor core to counter the negative reactivity insertion from the xenon ($^{135}$Xe) build-up during operation. This first passive technology is referred to as Burnable-poison Operating a Reactor with Gadolinium alloy (BORGalloy). For example, a burnable poison is loaded in an outer tie tube layer of a tie tube.

A second passive control technology includes tuning hydrogen pressure, for example, in the tie tube system to compensate for reactivity changes. This second passive technology is referred to as variable hydrogen density—HYPOSPRA.

A third passive control technology includes extending the wait time between burn cycles (bcs) when the nuclear reactor core is shutdown or merging burn cycles. For example, in a mission to Mars, the wait time between a Trans Martian Injection 1 (TMI1) burn cycle and a Trans Martian Injection 2 (TMI2) burn cycle is varied based on fuel type to optimize reactivity. Alternatively, the TMI1 and TMI2 burn cycles can be merged by having a single TMI burn cycle.

A fourth passive control technology is enhancement of temperature feedback mechanisms, such as designing the start-up and shut-down sequence to take advantage of the enhanced temperature feedback and doppler broadening of the LEU fuel in order to minimize control drum movement. For example, start up and operation can be accomplished by turning the control drums to a single predetermined angle and relying on passive temperature feedback to ensure reactor stability and the power cycle for small-scale reactivity control. This fourth passive control technology is referred to temperature feedback for simplified open-loop start-up sequences.

The four disclosed passive control technologies can be used alone or in combination with one another. In combination with BORGalloy and HYPOSPRA, extending the wait time between burn cycles or merging burn cycles can solve the issues associated with control drum movement during burn. A combination of BORGalloy, HYPOSPRA, and the temperature feedback mechanism can eliminate active control drum movement, for example, from a Trans Martian Injection 1 (TMI1) burn, a Mars Orbital Injection (MOI) burn, and a Trans Earth Injection (TEI) burn; and reduce the active control drum movement needed for a Trans Martian Injection 2 (TMI2) burn. In this implementation, BORGalloy counters the effects of fissile depletion and xenon build-up during full power operation, HYPOSPRA enables the use of a single initial control drum position shared for all burns, and the enhanced temperature feedback ensures that the reactor is thermally and neutronically stable. In one-burn TMI architectures and architectures with a long wait between burn cycles, such as TMI1 and TMI2, the active control drum movement can be completely eliminated.

When implemented in the NTP system, the passive control technologies provide: (1) minimal control drum movement from a set point; (2) increased performance by providing minimal loss of efficiency in the NTP system (e.g., as measured by the specific impulse); (3) ease of integration with existing NTP reactor design requirements; and (4) minimal increase in reactor mass. The specific impulse ($I_{sp}$) is the total impulse (or change in momentum) delivered per unit of propellant consumed and is dimensionally equivalent to the generated thrust divided by the propellant flow rate. The propellant is any compound and can be hydrogen (molecular weight 2), helium (molecular weight 4), or water ($H_2O$), for example. The propellant is typically stored in liquid form in a propellant tank.

While the reactivity control technologies are designed for NTPs, the technologies can also be applied to terrestrial nuclear systems. More specifically, the reactivity control technologies can be applied to terrestrial nuclear systems that need to be small and compact and have to operate in remote locations for extended periods of time where increased reliability throughout the reactor's lifetime is necessary. The reactivity control technologies can also be applied to space nuclear systems for power production by enabling an extension of nuclear reactor core lifetime without requiring a large control system and suppressing fluctuations in reactivity. This can be advantageous in space where there is a need for large amounts of power in support of missions to planetary bodies, asteroids, or space stations, or where there is an absence of sunlight or other energy sources to supply energy.

Reference now is made in detail to the examples illustrated in the accompanying drawings and discussed below. FIG. 1 illustrates an example of a nuclear thermal propulsion (NTP) system 100 that depicts an internal nuclear reactor core 110, a propellant line 120, a control drum 130, and other components of the assembly. In the example, the NTP system 100 is a type of nuclear reactor that operates on the principle of an expansion cycle which pumps a propellant, such as a hydrogen, through a propellant line 120 and the expansion cycle is driven by a turbopump assembly (TPA) 140. Pumps and turbines in the TPA 140 move the propellant through propellant piping 120 and the propellant becomes superheated in the nuclear reactor core 110 and expands to a gas.

The NTP system 100 uses the nuclear reactor core 110, such as a compact fission reactor core that includes nuclear fuel, to generate many megawatts of thermal power ($MW_t$) required to heat a propellant to high exhaust temperatures for rocket thrust. As shown, NTP system 100 includes an internal shield 160 and an external shield 150 to protect against the release of nuclear radiation from the nuclear reactor core 110, including against the release of neutron and gamma radiation to prevent excessive radiation heating and material damage. The internal shield 160 is located within the pressure vessel of NTP system 100 and the internal shield 160 includes interior propellant coolant channels to allow a propellant flow through. Internal shield 160 is positioned between the nuclear reactor core 110 and other components of the NTP system 100. External shield 150 includes two stacked discs and an outer radial portion. The two stacked discs of external shield 150 are typically surrounded by the outer radial portion which is cylindrically shaped or tapered. The internal and external shields 150 and 160 can be formed of lead and borated aluminum titanium hydride.

Nuclear reactor core 110 is a nuclear fission reactor that includes an array of fuel elements and array of tie tubes adjacent the array of fuel elements. In the example, the array of fuel elements are interspersed with the array of tie tubes and each of the tie tubes is in direct or indirect or contact with at least one fuel element of the nuclear reactor core 110.

The nuclear reactor core 110 provides thermal energy to drive the turbopump assembly (TPA) 140 and includes tie tubes to extract additional thermal energy to provide power to the TPA 140. A plurality of circumferential control drums 130 may surround the array of fuel elements and the array of tie tubes to change reactivity of the nuclear reactor core 110 by rotating the control drums 130. In the example, at least one neutron reflector 185 surrounds the nuclear reactor core 110 to regulate the neutron population of the nuclear reactor core 110. Multiple control drums 130 may be positioned in an area of the neutron reflector 185 to regulate the neutron population and reactor power level during operation.

Figure 2:
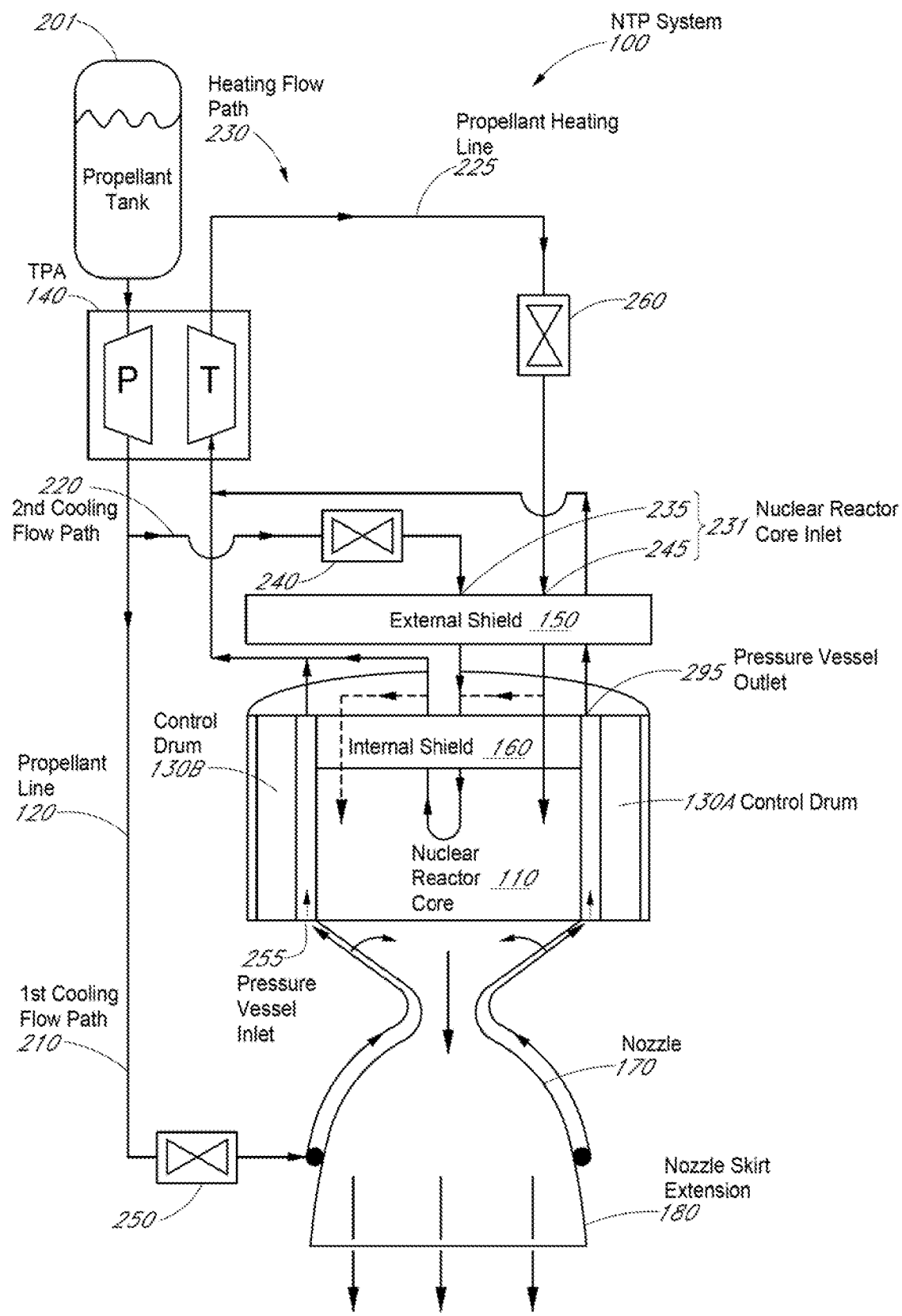
FIG. 2 is a flow diagram of the nuclear thermal propulsion system of FIG. 1 during a burn cycle (bc).

Operating the NTP system 100 during its various phases (startup, full thrust, and shutdown) is carried out by controlling the propellant, such as hydrogen, that is supplied via the TPA 140, to reach a desired reactor power level of the nuclear reactor core 110. Although not shown in FIG. 1, the TPA 140 is supplied with propellant from a propellant tank. The TPA 140 includes one or more turbopumps. In the example of FIG. 1, two turbopumps are shown; whereas, a single turbopump is shown in FIG. 2. A turbopump is a propellant pump with two main components: a rotodynamic pump and a driving gas turbine. The pump and turbine can be mounted on the same shaft, or sometimes geared together. The TPA 140 produces a high-pressure fluid for feeding the nuclear reactor core 110 and cooling the components of the NTP system 100.

When the propellant is superheated to a gas in the nuclear reactor core 110, the propellant accelerates and is exhausted for expansion in a thrust chamber comprised of a nozzle 170 and a nozzle skirt extension 180. The thermal expansion of the propellant through the nozzle 170 and the nozzle skirt extension 180 provides thrust. Some of the superheated propellant can be used to turn a turbine of the TPA 140 to drive the pump. Of note, some of the superheated propellant may be returned, for example bleeded from the nuclear reactor core 110 via a bypass, to turn the turbine of the TPA 140 to drive the pump. Subsequently, the expansion cycle repeats.

The generated thrust propels a vehicle that houses, is formed integrally with, connects, or attaches to the NTP system 100, such as a rocket, drone, unmanned air vehicle (UAV), aircraft, spacecraft, missile, etc. The vehicle can include various control nozzles for steering and other components.

To minimize or even eliminate the need for movement of the control drums 130 during an expansion (i.e., burn) cycle, a burnable poison, such as Gadolinium (Gd), is dispersed in the array of fuel elements or the array of the tie tubes of the nuclear reactor core 110. The fuel elements and tie tubes are assembled together in the nuclear reactor core 110. Alternatively or additionally, the burnable poison (e.g., Gd) is dispersed elsewhere in other components inside the nuclear reactor core 110 that are separate from the array of fuel elements and the array of the tie tubes. For example, one or more wires may be added to the nuclear reactor core 110 that are formed of an alloy with a dispersed burnable poison, such as the Gd alloy described with respect to inner tie tube layer 820 and outer tie tube layer 850 of FIG. 8. The alloy wire is housed inside the nuclear reactor core 110. The amount of Gd dispersed in the alloy wire or other component of the nuclear reactor core 110 depends on the thickness of the component, enrichment of the Gd, and the fuel material. In an example, the Gd dispersed in the component of the nuclear reactor core 110 is in a quantity greater than 0 parts per million (ppm) and less than or equal to one-thousand (1,000) ppm, for example, the quantity of Gd can be: 10 ppm to 20 ppm, 10 ppm to 30 ppm, 10 ppm to 70 ppm, 10 ppm to 80 ppm, 10 ppm to 100 ppm, 10 ppm to 200 ppm, 10 ppm to 300 ppm, 20 ppm to 30 ppm, 20 ppm to 70 ppm, 20 ppm to 80 ppm, 20 ppm to 100 ppm, 20 ppm to 200 ppm, 20 ppm to 300 ppm, 30 ppm to 70 ppm, 30 ppm to 80 ppm, 30 ppm to 100 ppm, 30 ppm to 200 ppm, 30 ppm to 300 ppm, or greater than 0 ppm and less than 1,000 ppm. By having a low composition (loading) of Gd in the component, low self-shielding properties of Gd can be achieved.

Also during the expansion cycle, the propellant stored in a propellant tank (element 201 in FIG. 2) is drawn through the nuclear reactor core 110 to cool the nuclear reactor core 110. A propellant density control valve system (shown in FIG. 2) adjusts the density of the propellant to maintain relatively constant reactivity across multiple burn cycles.

Although not shown, the NTP system 100 can include a burn cycle (bc) controller to set, monitor, and control a time length of burn cycles, number of burn cycles, and shutdown period length between burn cycles (i.e., wait time). For example, the burn cycle controller controls a subsequent burn cycle by monitoring elapsed time after a prior burn cycle and comparing the elapsed time length against a minimum wait time threshold and initiating the subsequent burn cycle via the nuclear reactor core 110 only upon determining that the minimum wait time threshold is satisfied or exceeded. Such a burn cycle controller is operable to control burn cycles by directly or indirectly adjusting movement of the turbopump assembly 140 and the control drums 130.

The burn cycle controller can control burn cycles by automatically adjusting burn cycle time length, number of burn cycles, wait times between burn cycles, or merge burn cycles in response to determining: (i) an amount of xenon build-up (i.e., accumulated xenon) in the nuclear reactor core 110 after an initial burn cycle; and (ii) depletion time necessary to reduce the xenon build-up to a sufficient level (e.g., zero or nearly zero) during a subsequent burn cycle. The determination of the xenon build-up amount and the depletion time can be made based on a calculation, such as by computer simulation or estimation, or empirical measurements. Alternatively or additionally, an operator can set the burn cycle time length, the number of burn cycles, the wait time between burn cycles, or merge the burn cycles via the burn cycle controller after determining the xenon build-up amount and the depletion time. The burn cycle controller also includes a temperature feedback mechanism. Burn cycle controller is discussed in further detail with respect to FIGS. 17-21.

FIG. 2 is a flow diagram of the nuclear thermal propulsion system 100 of FIG. 1 during a burn (i.e., expansion) cycle. As explained in more detail below, the depicted NTP system 100 includes multiple propellant density control valve systems (PDCVS) 240, 250, 260 that control the density of the propellant to maintain relatively constant reactivity over multiple burn cycles. Although three PDCVSs 240, 250, 260 are shown, the implemented NTP system 100 may not include a PDCVS 240, 250, 260 at all or include one, two, or more of the illustrated PDCVSs 240, 250, 260. When a PDCVS 240, 250, 260 is not used, reactivity control can be achieved by employing passive reactivity control technologies disclosed herein, for example, gadolinium loading.

During the burn cycle, the propellant (e.g., liquid hydrogen: $LH_2$) flows from a propellant tank 201 to the turbopump assembly (TPA) 140. Although the TPA 140 is shown as a single turbopump in FIG. 2, the NTP system 100 typically includes more than one turbopump, for example, two turbopumps as shown in FIG. 1. The propellant is moved by the pump (P) of the turbopump assembly 140 and is split into two cooling flow paths in this example.

The first cooling flow path 210 cools the nozzle 170, pressure vessel (element 330 in FIG. 3), neutron reflector (element 185 in FIG. 1), and control drums 130A-B. A propellant density control valve system (PDCVS) 250 can be in the first cooling flow path 210 to adjust the density of the propellant that is flowed to nozzle 170, pressure vessel (element 330 in FIG. 3), neutron reflector (element 185 in FIG. 1), and control drums 130A-B. Because of the transition of the propellant from a liquid to a gas state during the burn cycle, density is controlled by varying the hydrogen pressure in the propellant loop as per the ideal gas law (PV=nRT) where a percentage change in pressure is accompanied by a corresponding percentage change in density.

The second cooling flow path 220 cools the tie tubes (elements 320A-N in FIG. 3) of the nuclear reactor core 110. PDCVS 240 can be in the second cooling flow path 220 to adjust the density of the propellant that is flowed to the tie tubes (elements 320A-N in FIG. 3) of the nuclear reactor core 110. In one example, when the propellant density is varied in the tie tubes and associated systems by varying percentages from 100% to 200% of nominal propellant density (equivalent to the same percentages from nominal propellant pressures), the reactivity of the nuclear reactor core 110 is noticeably increased. Alternatively, the TPA 140 itself can adjust the density of the propellant.

Figure 3:
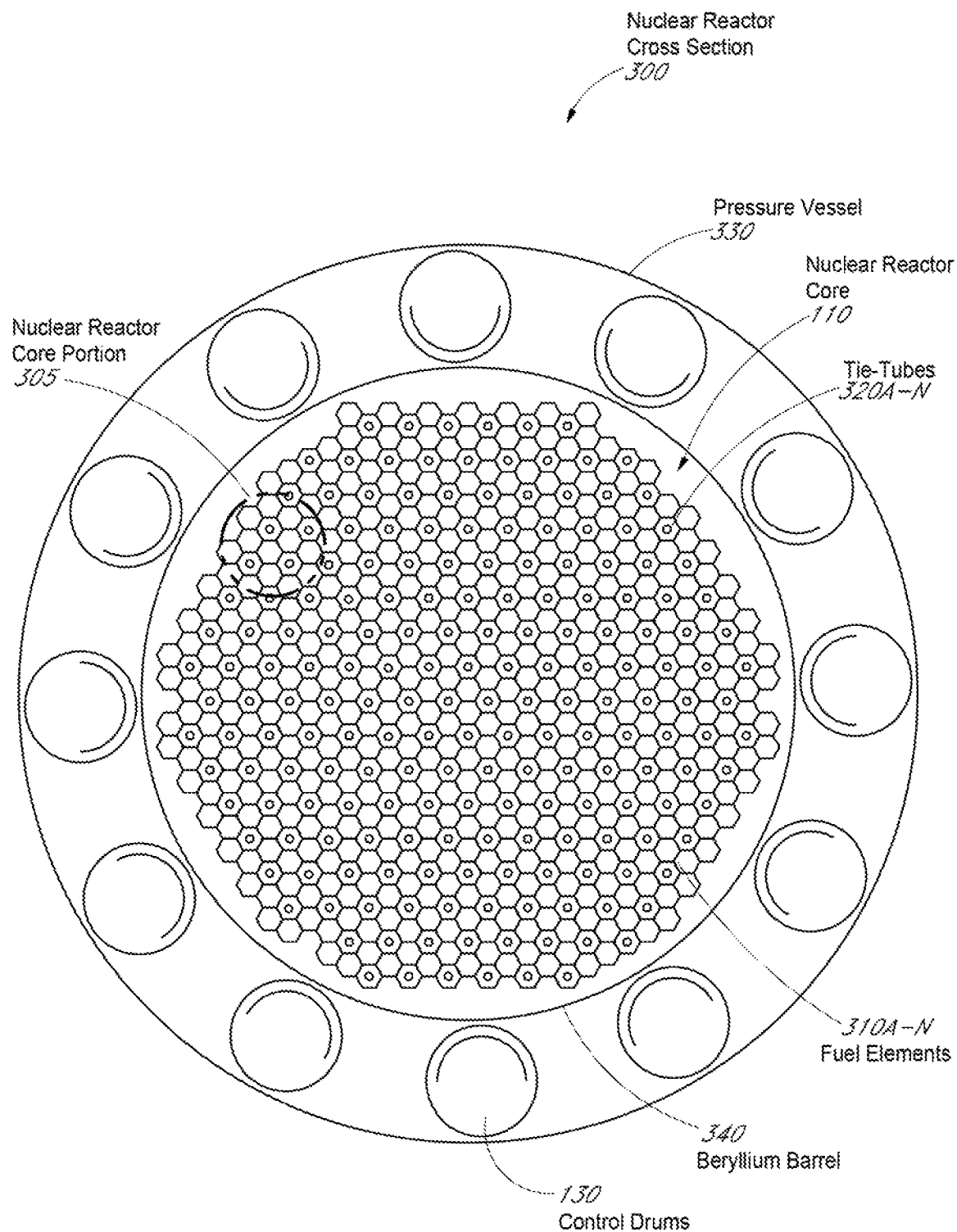
FIG. 3 is a cross-sectional view of the nuclear reactor core and components, including an array of fuel elements and an array of tie tubes.

The cooling flow paths 210, 220 are then merged and the propellant (e.g., heated hydrogen gas) is used to drive the turbine (T) of TPA 140 in a heating flow path 230 as depicted in FIG. 3. A PDCVS 260 can be in the heating flow path 230 to adjust the density of the propellant that is flowed to the fuel elements (310A-N in FIG. 3) of the nuclear reactor core 110.

The propellant, which is now turbine exhaust (e.g., hydrogen gas—$H_2$) is then routed back into the pressure vessel (element 330 in FIG. 3) and the internal shield 160 of nuclear reactor core 110. Next, the propellant enters propellant passages (elements 410A-N in FIGS. 4-5, 7) in fuel elements (310A-N in FIG. 3) of the nuclear reactor core 110. Consequently, the propellant absorbs thermal energy produced from the fission of the nuclear fuel and is superheated to high exhaust temperatures (e.g., 2550° to 29500 K), then expanded out a nozzle 170 and nozzle skirt extension 180 with a high area (e.g., 300:1) for thrust generation.

Each PDCVS 240, 250, 260 can include a valve and an actuator. Each PDCVS 240, 250, 260 can be electronically or mechanically operated by one or more actuators that activate a valve mechanically, electronically, or using a combination thereof. The valve in each PDCVS 240, 250, 260 can be spring loaded to one position and electrically actuated to another position to adjust valve position and hence propellant density via electric signals from a computer. Mechanically activated valves can be advantageous for control of liquid propellant flows; whereas, electrically activated valves can be used for lighter loads, such as gaseous propellant flows.

For example, the valve of each PDCVS 240, 250, 260 is controlled by the actuator via mechanical energy, such as hydraulic fluid pressure, pneumatic pressure, thermal energy, or magnetic energy. The actuator can be controlled by external mechanical energy or electronic circuitry, for example, the actuator can be driven by electric current control signals from a computer, microcontroller, digital or analog circuit, etc. The actuator can be a solenoid, variable displacement pump, electric motor, hydraulic cylinder, pneumatic, screw jack, ball screw, hoist, rack and pinion, wheel and axle, chain drive, servomechanism, stepper motor, piezoelectric, shape-memory, electroactive polymer, thermal bimorph, etc. In one example, the actuator is an internally piloted solenoid valve that acts directly on the valve. The valve and the actuator can collectively form a solenoid valve or a servovalve, such as an electrohydraulic servo valve. It may be advantageous for each PDCVS 240, 250, 260 to include multiple actuators, such as a solenoid driven by conveyed electric control signals that, in turn, acts on other actuators, such as a larger rack and pinion actuator, that in turns controls a pneumatically actuated valve, for example.

As shown, the NTP system 100 comprises a propellant tank 110 to store the propellant, a nuclear reactor core inlet 231 directly or indirectly connected to the nuclear reactor core 110, a propellant line 120 directly or indirectly connected to the propellant tank to flow the propellant to the nuclear reactor core inlet 231, and a propellant density control valve system 240 or 260 directly or indirectly connected between the propellant line 120 and the nuclear reactor core inlet 231 to regulate density of the propellant flowing into the nuclear reactor core 110.

NTP system 100 further comprises a turbopump assembly (TPA) 140 comprising at least one turbopump that includes a turbine (t) and a pump (p). The pump (p) is configured to cool the nuclear reactor core 110 during a burn cycle by flowing the propellant from the propellant tank 201 through the propellant line 120 to the propellant density control valve system 240 and then through the nuclear reactor core inlet 231. As shown, the nuclear reactor core inlet 231 includes a tie tube inlet 235 to flow the propellant to the array of tie tubes (elements 320A-N in FIG. 3) and is directly or indirectly connected to the propellant density control valve system 240 and a respective propellant supply passage (element 810 in FIG. 8) of a respective tie tube (element 320 in FIG. 8) in the array of tie tubes (elements 320A-N in FIG. 3). The pump (p) may be further configured to flow the propellant through the tie tube inlet 235, through the respective propellant supply passage (element 810 in FIG. 8) of the respective tie tube (element 320 in FIG. 8) in the array of tie tubes (elements 320A-N in FIG. 3), and then through a respective propellant return passage (element 840 in FIG. 8) of the respective tie tube (element 320 in FIG. 8).

The NTP system 100 further comprises a propellant heating line 225 directly or indirectly connected to the turbine (t) and the respective propellant return passage (element 840 in FIG. 8) of the respective tie tube (element 320 in FIG. 8). As depicted, the NTP system 100 further comprises a second propellant density control valve system 260 directly or indirectly connected to the turbine (t) and the nuclear reactor core inlet 231 to regulate density of the propellant flowing back to the nuclear reactor core inlet 231. The pump (p) may be configured to flow the propellant returned by the respective propellant return passage (element 840 in FIG. 8) to the turbine (t) via the propellant heating line 225. The turbine is configured to flow the propellant back to the second propellant density control valve system 260 and the nuclear reactor core inlet 231 as shown.

Figure 4:
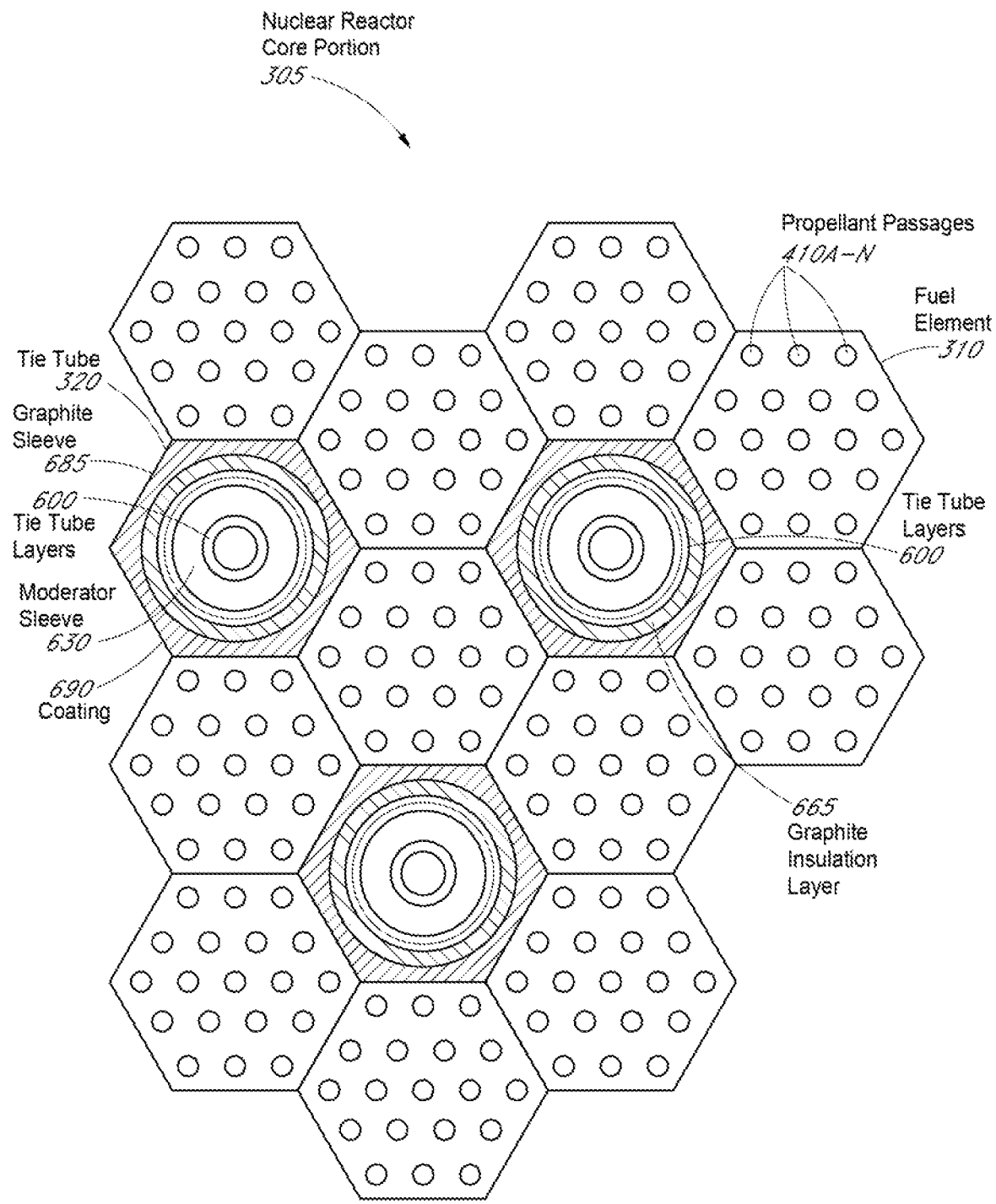
FIG. 4 is an enlarged plane view of a portion of the nuclear reactor core of FIG. 3 depicting an array of fuel elements interspersed with an array of tie tubes.

In the example, the nuclear reactor core inlet 231 further includes a fuel element inlet 245 to flow the propellant to the array of fuel elements (elements 310A-N in FIG. 3) and is directly or indirectly connected to the second propellant density control valve system 260 and a respective propellant passage (element 410A-N in FIGS. 4-5, 7) of a respective fuel element (element 310 in FIGS. 4-5, 7) of the array of fuel elements (elements 310A-N in FIGS. 3-4). The turbine (t) may be configured to flow the propellant to the second propellant density control valve system 260, through the fuel element inlet 245, and then through the respective propellant passage (element 410A-N in FIGS. 4-5, 7) of the respective fuel element (element 310 in FIGS. 4-5, 7) of the array of fuel elements (elements 310A-N in FIGS. 3-4).

NTP system 100 may further comprise a pressure vessel (element 330 in FIG. 3) housing the nuclear reactor core 110 that is directly or indirectly connected to the propellant density control valve system 240 or 260. The pressure vessel (element 330 in FIG. 3) includes a pressure vessel inlet 255 connected to the periphery volume of the pressure vessel (element 330 in FIG. 3) that is outside of the nuclear reactor core 110. The pressure vessel (element 330 in FIG. 3) may include a pressure vessel outlet 295 to return the propellant passing through the periphery of the pressure vessel (element 330 in FIG. 3). The depicted NTP system 100 further comprises a propellant heating line 225 directly or indirectly connected to the turbine (t) and the pressure vessel outlet 295. The pump (p) may be further configured to flow the propellant to the pressure vessel inlet 255, through the periphery of the pressure vessel (element 330 in FIG. 3), and then flow the returned propellant from the pressure vessel outlet 295 to the turbine (t) via the propellant heating line 225.

As shown, the NTP system 100 further comprises a nozzle 170, a plurality of control drums 130A-B, a neutron reflector (element 185 in FIG. 1), and a second propellant density control valve system 250 directly or indirectly connected between the propellant line 120 and the pressure vessel inlet 255 to regulate density of the propellant flowing into the nozzle 170, periphery of the pressure vessel (element 330 in FIG. 3), neutron reflector (element 185 in FIG. 1), and control drums 130A-B.

In our example, each of the propellant density control valve systems 240, 250, 260 includes a regulator valve to adjust density of the propellant passing through the regulator valve from an initial density when entering the regulator valve to a regulated density when exiting the regulator valve. Each of the propellant density control valve systems 240, 250, 260 also includes an actuator to actuate the regulator valve by adjusting the regulated propellant density upwards during each subsequent burn cycle to maintain constant reactivity at a beginning of each of the subsequent burn cycles. The actuator can be electric, mechanical, thermal, magnetic, or a combination thereof. The propellant density control valve systems 240, 250, 260 can further include a flow control circuit to control speed of the actuator and the flow control circuit is a bleed-off circuit, meter-out circuit, or meter-in circuit.

The regulator valve and the actuator of each of the propellant density control valve systems 240, 250, 260 can form a solenoid valve or an electrohydraulic servovalve. In an example, the regulator valve and the actuator form the solenoid valve and the solenoid valve is controlled by electric signals conveyed from an external computer, a digital circuit, an analog circuit, or a combination thereof.

The propellant can be hydrogen and the regulator valve can be configured to regulate the density of the hydrogen by adjusting the percentages between 100% and 200% of nominal hydrogen density (equivalent to the same percentages from nominal hydrogen pressures) to increase reactivity of the nuclear reactor core 110. This density adjustment range can be inclusive or exclusive of the 100% or 200% endpoints (include 100% and 200% or exclude 100% and 200%). For example, the regulator valve is configured to adjust density of the hydrogen from an initial density to a regulated density by varying pressure between 100% and 200% of nominal hydrogen pressure, inclusive, to increase reactivity of the nuclear reactor core 110. The nominal hydrogen pressure can be 5 to 15 megapascals (MPa), and more specifically can be 8 MPa.

FIG. 3 is a cross-sectional view 300 of the nuclear reactor core 110 and components, including an array of fuel elements 310A-N and an array of tie tubes 320A-N bundled together. As shown in FIG. 3, the fuel elements 310A-N and tie tubes 320A-N are typically hexagonally shaped elements. A beryllium barrel 340 surrounds the bundled collection that includes the array of fuel elements 310A-N and the array of tie tubes 320A-N of the nuclear reactor core 110. As depicted, the control drums 130 then surround the beryllium barrel 340 and reside on the perimeter or periphery of a pressure vessel 330. The pressure vessel 330 can be comprised of other components, including cylinders, piping, and storage tanks that transfer the propellant, such as hydrogen gas.

The beryllium barrel 340 includes partially hexagonally shaped filler elements which surround the perimeter of the fuel elements 310A-N and tie tubes 320A-N that make up the nuclear reactor core 110. Typically the control drums 130, fuel elements 310A-N, and tie tubes 320A-N are the same length; however, it should be understood that the lengths can differ depending on the implementation. A portion of the nuclear reactor core 110 is encircled as element 305 and this nuclear reactor core portion 305 is magnified in FIG. 4.

FIG. 4 is an enlarged plane view of a portion of the nuclear reactor core 110 of FIG. 3. The nuclear reactor core portion 305 depicts an array of fuel elements 310A-N interspersed with an array of tie tubes 320A-N. In the example, each fuel element 310A-N is in contact with three tie tubes 320A-N; however, it should be understood that fuel elements on the periphery of the nuclear reactor core 110 typically contact fewer tie tubes 320A-N. Six fuel elements 310A-N surround each tie tube 320A-N. The ratio of fuel elements 310A-N to tie tubes 320A-N can be adjusted. The fuel elements 310A-N and tie tubes 320A-N are hexagonally shaped elements. As shown, each tie tube 320 includes two tie tube layers 600 (inner and outer layers), a moderator sleeve 630, a graphite sleeve, and a coating 690. The coating 690 of the tie tube 320 can be formed of zirconium carbide (ZrC). Each fuel element 310 includes propellant passages 410A-N.

Figure 5:
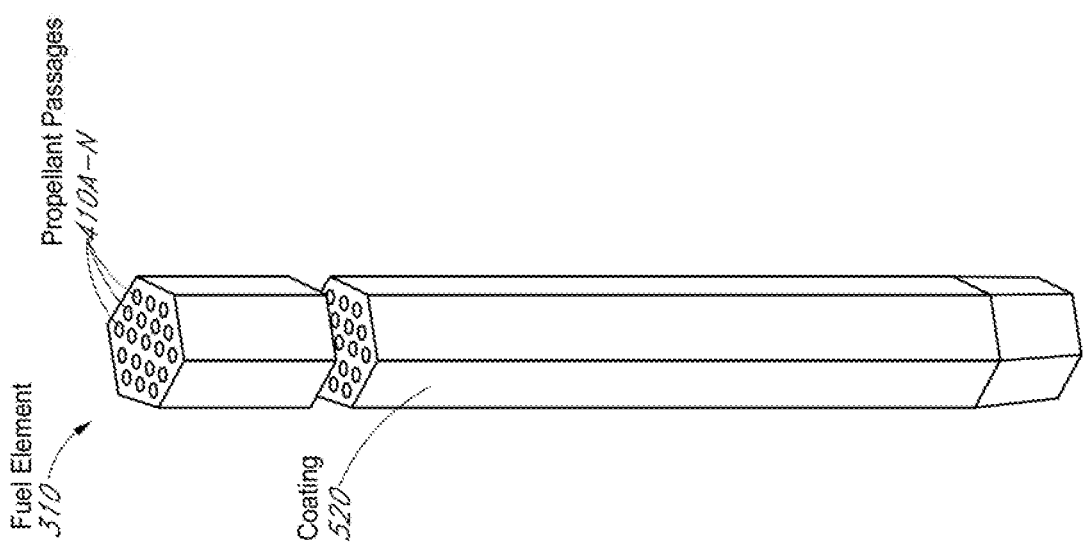
FIG. 5 is an illustration of a fuel element of the nuclear reactor core.

FIG. 5 is an illustration of a fuel element 310 of the nuclear reactor core 110. The fuel element 310 is formed of a nuclear fuel, such as a uranium and graphite fuel. In the example, the fuel element 310 includes nineteen propellant passages 410A-N that are equally spaced opening or holes to allow the propellant to pass through a respective channel in the nuclear reactor core 110 and into a thrust chamber (not shown). In other words, the propellant passages 410A-N are the flow path for the propellant to pass through the fuel element 310 in the nuclear reactor core 110. Although not shown, the thrust chamber is typically positioned at the bottom of the nuclear reactor core 110. The propellant passages 410A-N in the fuel element 310 are approximately 2.54 mm in diameter. It should be understood that the number of propellant passages 410A-N in the fuel element 310 and size (e.g., diameter) can be varied. The external surfaces of the fuel element 310 and the propellant passages 410A-N have a deposited coating 520, such as ZrC.

Figure 6:
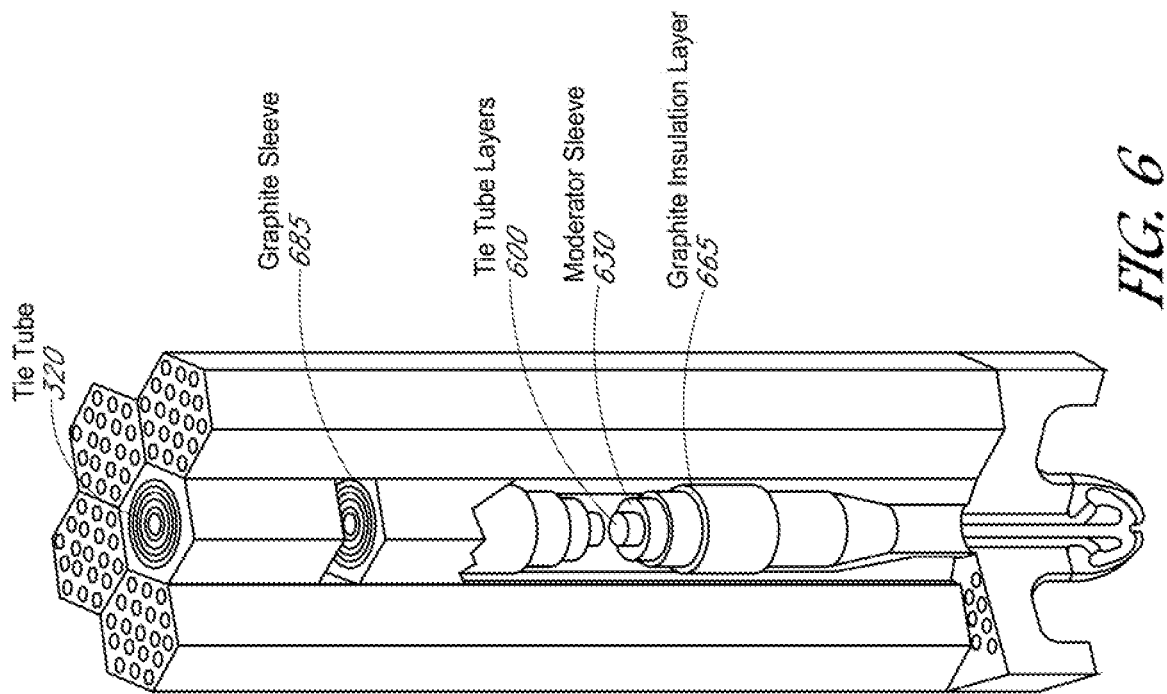
FIG. 6 is an illustration of a tie tube of the nuclear reactor core.

FIG. 6 is an illustration of a tie tube 320 of the nuclear reactor core 110. The tie tube 320 provides in-core cooling and structural support for the nuclear reactor core 110. As shown, tie tube 320 houses two tie tube layers 600 (inner and outer layers), a moderator sleeve 630, a graphite insulation layer 665, and a graphite sleeve 685 surrounded by a coating (element 690 in FIG. 4 and element 890 in FIG. 8).

The moderator sleeve 630 is a neutron moderator mass, typically formed of a solid hydride (ZrH, YH, LiH, etc.), such as zirconium hydride (e.g., $ZrH_{1.8}$), that thermalizes fast neutrons resulting from nuclear fission events. Because the quantity of thermal energy obtained by cooling the nozzle (element 170 in FIGS. 1-2) and control drum (element 130 in FIGS. 1-2) is inadequate, the nuclear reactor core 110 includes the tie tube 320 to extract additional thermal energy from the nuclear reactor core 110. A cooled propellant, such as hydrogen, passes through the center of the tie tube 320 via a propellant supply passage (element 810 in FIG. 8). The propellant is then returned via an outer annular flow path through the tie tube 320 via a propellant return passage (element 840 in FIG. 8). Hence, the tie tube 320 behaves as a dual pass heat exchanger.

FIG. 7 is a cross-sectional view of the fuel element 310 of FIGS. 4 and 5. The length of the cross-section of the fuel element 310 is approximately 1.913 cm. The fuel element 310 includes a fuel matrix 730 that has a hexagonally shaped cross-section and is formed of (UC—ZrC)C composite material. Nineteen propellant passages 410A-N with an approximately 2.54 mm diameter opening are formed as channels in the fuel matrix 730 as depicted. A zirconium carbide (ZrC) coating 520 is deposited on the fuel matrix 730. A burnable poison, such as Gd can be dispersed inside the fuel matrix 730, which can be advantageous in terms of self-shielding, particularly for a graphite composite matrix based fuel type.

FIG. 8 is a cross-sectional view of the tie tube 320 of FIGS. 4 and 6 that depicts inner and outer tie tube layers and other layers of the tie tube 320. At approximately 1.913 cm, the length (L) of the cross-section of the tie tube 320 is the same or similar to the fuel element 310. As shown, the tie tube 320 includes a propellant supply passage 810 to flow a propellant, an inner tie tube layer 820 surrounding the propellant supply passage 810, a moderator sleeve 830 surrounding the inner tie tube layer 820, a propellant return passage 840 surrounding the moderator sleeve 830, and an outer tie tube layer 850 surrounding the propellant return passage 840. The layers of the tie tube 320 are radially or annularly arranged, including the propellant supply passage 810, the inner tie tube layer 820, the moderator sleeve 830, the hydrogen return passage 840, and the outer tie tube layer 850, etc.

In this example, the inner tie tube layer 820 has an approximately 0.521 mm outer diameter and a 1.02 mm thick radial wall. The moderator sleeve 830 has an approximately 0.533 mm inner diameter and an approximately 1.168 mm outer diameter. The outer tie tube layer 850 has an approximately 1.410 mm outer diameter and an approximately 0.54 mm thick radial wall. Hence, the respective radial wall thickness of the outer tie tube layer 850 is less than the inner tie tube layer 820.

As shown, the tie tube 320 also includes an inner gap 860 (e.g., a first gap) that is an approximately 0.13 mm space between the inner tie tube layer 820 and the moderator sleeve 730. The tie tube 320 also includes a graphite insulation layer 865 surrounding the outer tie tube layer 850. The graphite insulation layer 865 is pyrolytic graphite thermal insulation (e.g., zirconium carbide) and has an approximately 1.613 mm outer diameter and an approximately 1.410 mm inner diameter. Tie tube 320 also includes a medial gap 870 that is an approximately 0.13 mm space (e.g., a second gap) between the outer tie tube layer 850 and the graphite insulation layer 865. The tie tube 320 also includes an outer gap 880 (e.g., third gap) that is an approximately 0.13 mm space surrounding the graphite insulation layer 865. The graphite insulation layer 865 is formed of zirconium carbide (ZrC), but ZrC can be replaced or supplemented with other materials besides zirconium carbide, such as titanium carbide, silicon carbide, tantalum carbide, hafnium carbide, ZrC—ZrB$_2$ composite, or ZrC—ZrB$_2$—SiC composite. It should be understood that the tie tube 320 can be formed with an arbitrary number of gaps, such as one gap, two gaps, or more than three gaps. Alternatively, the tie tube 320 can be formed with no gaps at all, for example, the inner gap 860, the medial gap 870, and the outer gap 800 may not be present.

As shown, a graphite sleeve 885 surrounds the outer gap 880, and a coating 890 formed of zirconium carbide or niobium carbide surrounds the graphite sleeve 885. The graphite sleeve 885 has an approximately 1.626 mm inner diameter.

The inner tie tube layer 820 and outer tie tube layer 850 can be formed of a variety of alloys, including austenitic nickel-chromium based superalloys known as Inconel. An alloy that forms the outer tie tube layer 820 may be supplemented with a burnable poison that includes Gadolinium (Gd) and the Gd is dispersed in the alloy that forms the outer tie tube layer 850. Alternatively or additionally, an alloy that forms the outer tie tube layer 820 is supplemented with a burnable poison that includes Gadolinium (Gd) and the Gd is dispersed in the alloy that forms the inner tie tube layer 720. The Gd dispersed in the inner or outer tie tube layer alloys can be in a quantity of greater than 0 parts per million (ppm) and less than or equal to one-thousand (1,000) ppm, for example, 20 parts per million (ppm) to 200 ppm, or 20 ppm to 30 ppm. The amount of Gd dispersed in the Gd alloy depends on the thickness of the component, the enrichment of the Gd, and the fuel material. By having a low composition of Gd in the inner or outer tie tube layer alloys, low self-shielding properties of Gd are advantageously obtained.

Inconel alloys are oxidation and corrosion-resistant materials well suited for service in extreme environments subjected to high pressure and kinetic energy. When heated, Inconel forms a thick and stable passivating oxide layer protecting the surface from further attack.

Different Inconels have widely varying compositions, but all are predominantly nickel, with chromium as the second element. In one example, Inconel 718 is used, which comprises nickel (50.0-55.0%), chromium (17.0-21.0%), iron (balance), molybdenum (2.8-3.3%), niobium (4.75-5.5%), cobalt (1.0%), manganese (0.35%), copper (0.2-0.8), aluminum (0.65-1.15%), titanium (0.3%), silicon (0.35%), carbon (0.08%), sulfur (0.015%), phosphorus (0.015%), and boron (0.006%) in varying percentages by mass. Other Inconels can be used, such as Inconel 600, 617, 625, 690, and X-750, which include subsets of the elements found in Inconel 718 and in different percentages by mass.

The burnable poison can be dispersed in various locations or layers of the tie tube 320, including the moderator sleeve 830, the inner tie tube layer 820, and the outer tie tube layer 850. Of these locations, the outer tie tube layer 850 may be selected as the location of choice due to thinness of the outer tie tube layer 850 relative to the inner tie tube layer 820 and the moderator sleeve 830, as well as the reduced role of the outer tie tube layer 850 as a structural element when compared with the inner tie tube layer 820. The thinness of the outer tie tube layer 850 reduces the spatial self-shielding of the burnable poison and the lack of need to provide structural support reduces the worry that additions of Gd to the material reduces strength of the outer tie tube layer 850 below acceptable levels. As noted in FIG. 7 above, while the fuel matrix is promising in terms of self-shielding, particularly for the graphite composite fuel type matrix, the outer tie tube 850 of tie tube 320 can be advantageous because of the reduced cost compared to the exponential increase in development costs associated with nuclear fuel development.

Also, the spacing size of the gaps 860, 870, and 880 can vary depending on the implementation of the tie tube 320. The outer tie tube layer 850 can also be formed of or supplemented with zirconium or zirconium carbide.

Baseline Nuclear Fuel Cores

FIG. 9 is a table of two reference cores based on two fuel types, Superb Use of Low Enriched Uranium (SULEU) 910 utilizing (U,Zr)C in a graphite composite matrix and the Space Capable Cryogenic Thermal Engine (SCCTE) 920 utilizing UO$_2$ in a tungsten (W) ceramic and metal matrix (CERMET), that includes configuration and performance details. Although the examples disclosed herein relate to passive reactivity control systems applied to two baseline LEU-NTP cores that include SULEU 910 and SCCTE 920, it should be understood that different fuel cores can be used. Other fuel cores that can be used include coated UC$_2$ in graphite; (U, Zr, X)C where X=Ta, W, Hf advanced tricarbide; (U, Zr)C (binary) (U, Zr, Nbc)C (ternary) carbide type fuels, UO2 in a refractory metal matrix such as Mo, Os, or Nb; or coated U-compounds in a refractory carbide matrix such as SiC, ZrC, or NbC.

The first core, SULEU 910, is a graphite composite fueled core, that is a solid hydride moderated (ZrH, YH, LiH, etc.) LEU nuclear thermal propulsion concept. The second core, SCCTE 920, is a LEU CERMET fueled core, that is an LEU W—UO2, solid hydride moderated (ZrH, YH, LiH, etc.) LEU nuclear thermal propulsion concept. Although various solid hydride moderators can be used to form the moderator sleeve of the tie tubes to moderate the fuel elements of the SULEU 910 and SCCTE 920 cores, in an example, the moderator sleeve of the tie tubes includes $ZrH_x$ and more specifically $ZrH_{1.8}$. Both SULEU 910 and SCCTE 920 are mass optimized systems designed for a 2030s human Mars mission with the same thrust and Isp. The SULEU 910 and SCCTE 920 cores are designed using the SPACE code (a variant of the SPOC code) and identified through a brute force optimization where thousands of core configurations are generated and then analyzed for their performance.

The core configurations, core details, and performance specifications of SULEU 910 and SCCTE 920 are provided in FIG. 8. SCCTE 920 was originally presented at the 2015 Winter American Nuclear Society along with the details of the optimization method in Eades M. J, Deason W. R., Patel V. K., "SCCTE: An LEU NTP Concept with Tungsten Cermet Fuel," Winter American Nuclear Society Meeting 2015, Washington D.C. (November 2015), the contents of which is incorporated by reference in its entirety as if fully set forth herein. The same optimization method was also used for SULEU 910 and was presented at the Nuclear and Emerging Technology for Space 2016 conference in Venneri P. F., Eades M. J. "A Point Design for a LEU Composite NTP system: Superb Use of Low Enriched Uranium (SULEU)," Nuclear and Emerging Technologies for Space 2016, Huntsville, Ala. (February, 2016), the contents of which is incorporated by reference in its entirety as if fully set forth herein.

Figure 10:
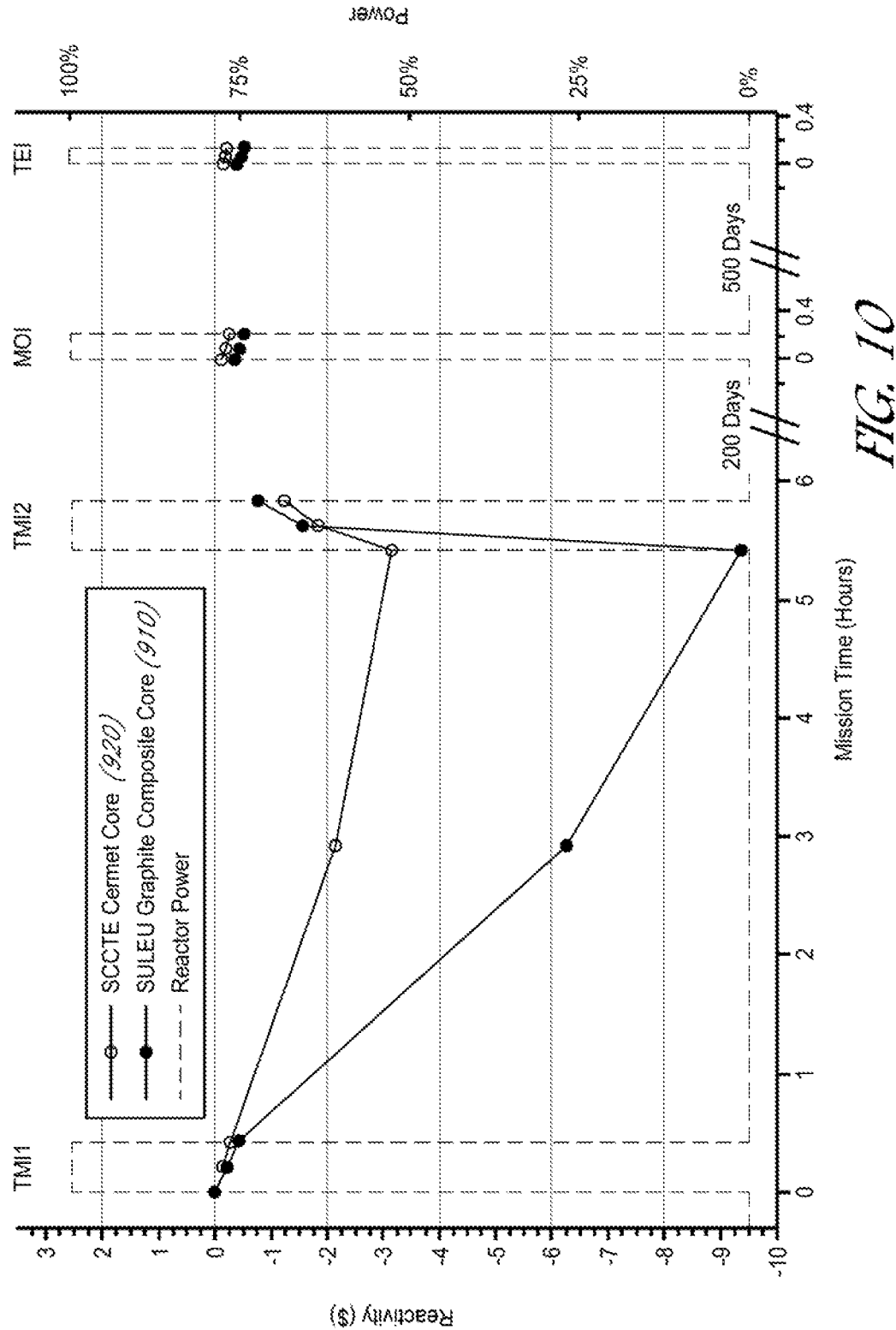
FIG. 10 is a graph illustrating reactivity over time of the two reference cores of FIG. 9.

FIG. 10 is a graph illustrating reactivity over time of the two reference cores of FIG. 9. Specifically, FIG. 10 presents how reactivity changes for the SULEU 910 and SCCTE 920 reactors over a timeline of a DRA 5 style mission to Mars. These curves were produced with computational tools, including customized code and Monte Carlo reactor physics codes such as MCNP 6.1 and Serpent 2 for neutronic analysis.

Four burn cycles are shown which are Trans Martian Injection 1 (TMI1), Trans Martian Injection 2 (TMI2), Mars Orbital Injection (MOI), and Trans Earth Injection (TEI). The TMI1, TMI2, MOI, and TEI are shown in FIGS. 13-18 as a first burn cycle (bc), a second burn cycle, a third burn cycle, and a fourth burn cycle, respectively.

A number of phenomena can be seen in the graph of FIG. 10. During full power operation there are two factors which result in the reduction of reactivity which consequently requires the rotation of the control drums to maintain a critical reactor: fissile material depletion ($^{235}$U) and fission product production (notably the powerful fission products $^{135}$Xe). The combination of these two factors, results in the noticeable reduction in reactivity during the full power burns. The most noticeable feature in FIG. 10, however, is the large negative reactivity insertion between TMI1 and TMI2 and the resulting reactivity surge during TMI2. This is caused by the fission product $^{135}$I which then decays (6.6 hour Half-life) into 135Xe (9.1 hour Half-life) causing the 135Xe to buildup and producing the large negative reactivity insertion.

Figure 11:
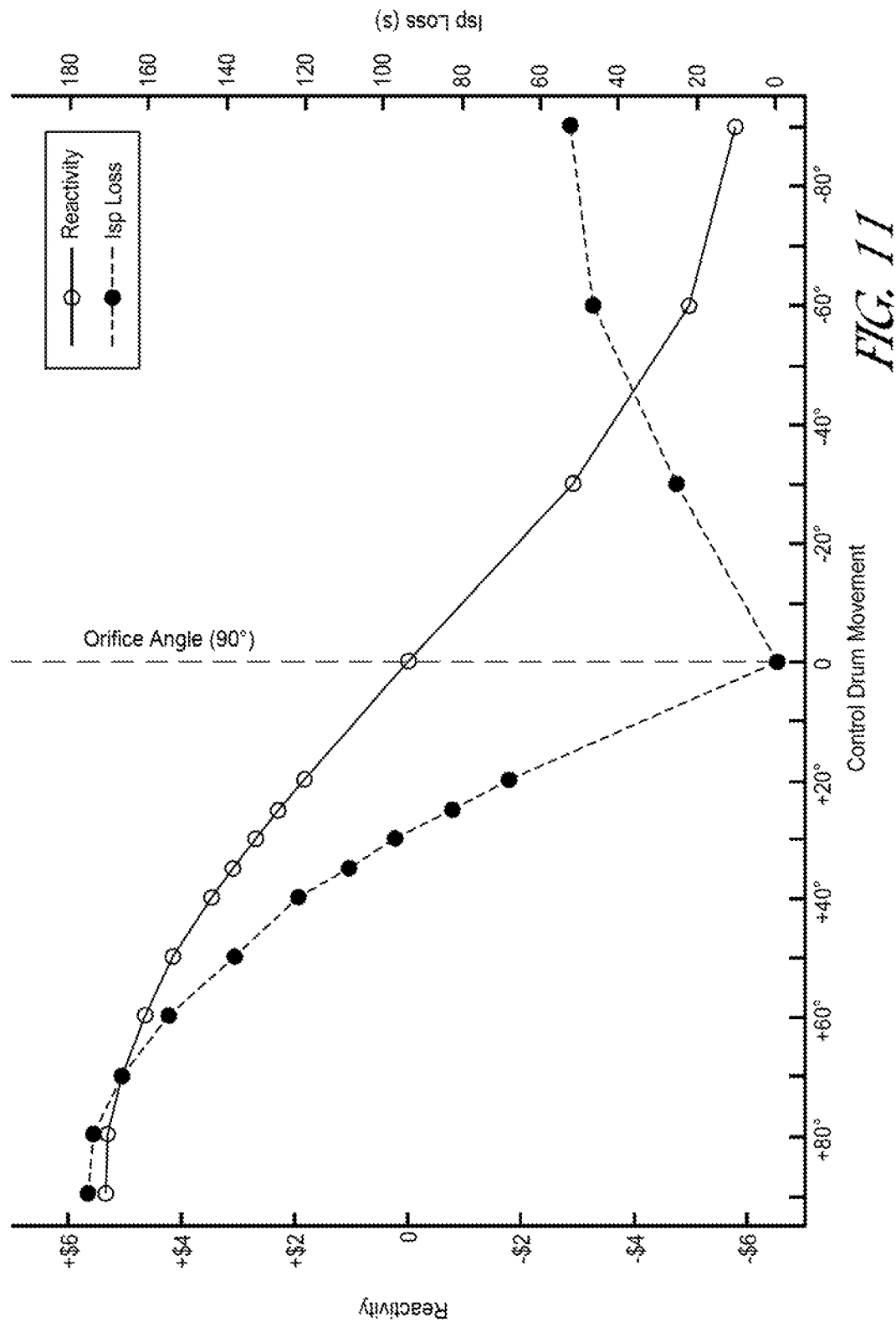
FIG. 11 is a graph illustrating a specific impulse ($I_{sp}$) penalty associated with turning a control drum for a nuclear reactor core that utilizes SCCTE.
Figure 12:
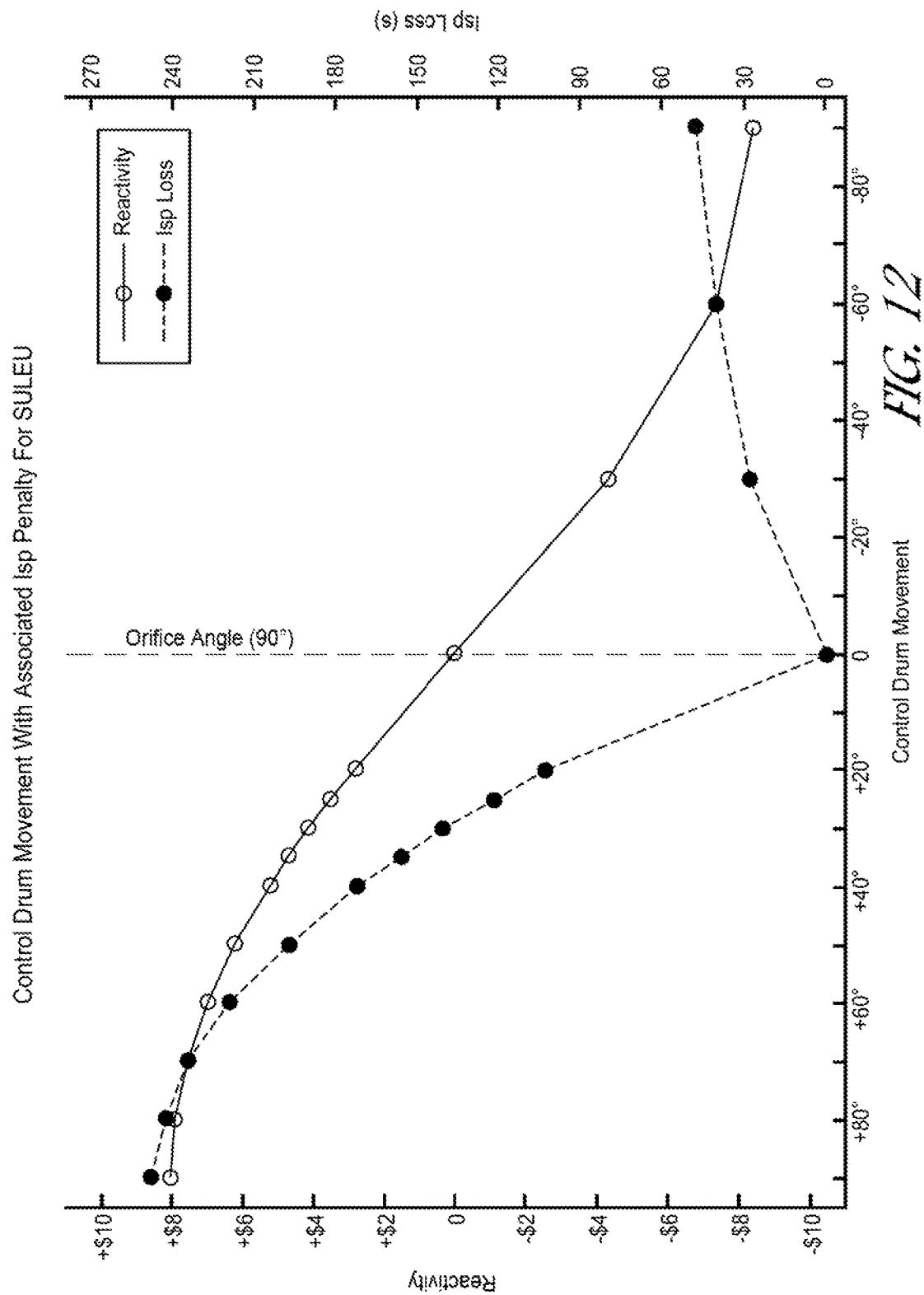
FIG. 12 is a graph illustrating a specific impulse ($I_{sp}$) penalty associated with turning a control drum for a nuclear reactor core that utilizes SULEU.

FIG. 11 is a graph illustrating a specific impulse ($I_{sp}$) penalty associated with turning a control drum for a nuclear reactor core that utilizes the SCCTE core. FIG. 12 is a graph illustrating a specific impulse ($I_{sp}$) penalty associated with turning a control drum for the SULEU core. In existing NTP designs, such as for SCCTE and SULEU cores, the reactivity changes noted in FIG. 10 are resolved by rotating the radial control drums. This, however, introduces a number of issues.

First of all there is a loss of $I_{sp}$ associated with circumferential control drum movement from a designed nominal position of the control drums. The $I_{sp}$ loss stems from the need for each propellant coolant channel in an NTP reactor to be orificed to the power deposited in that channel in order to achieve the desired propellant coolant exit temperature. When the circumferential control drums rotate, the spatial power deposition changes and renders the careful channel orificing ineffective as it no longer aligns with the spatial power deposition. This then ensures that certain elements will be receiving more power than they were orificed for which then requires that the entire core power be reduced in order to prevent these elements from exceeding their maximum allowable temperatures and to maintain the desired thrust level.

Beyond losing $I_{sp}$, actively turning control drums during operation is very complicated. A nested closed loop control system with control drums and rocket power cycle is enormously complex. Furthermore, actively turning control drums introduces a failure mechanism to the reactor as control drums can get stuck or over insert reactivity.

Burnable Poison—BORGalloy

Figure 13:
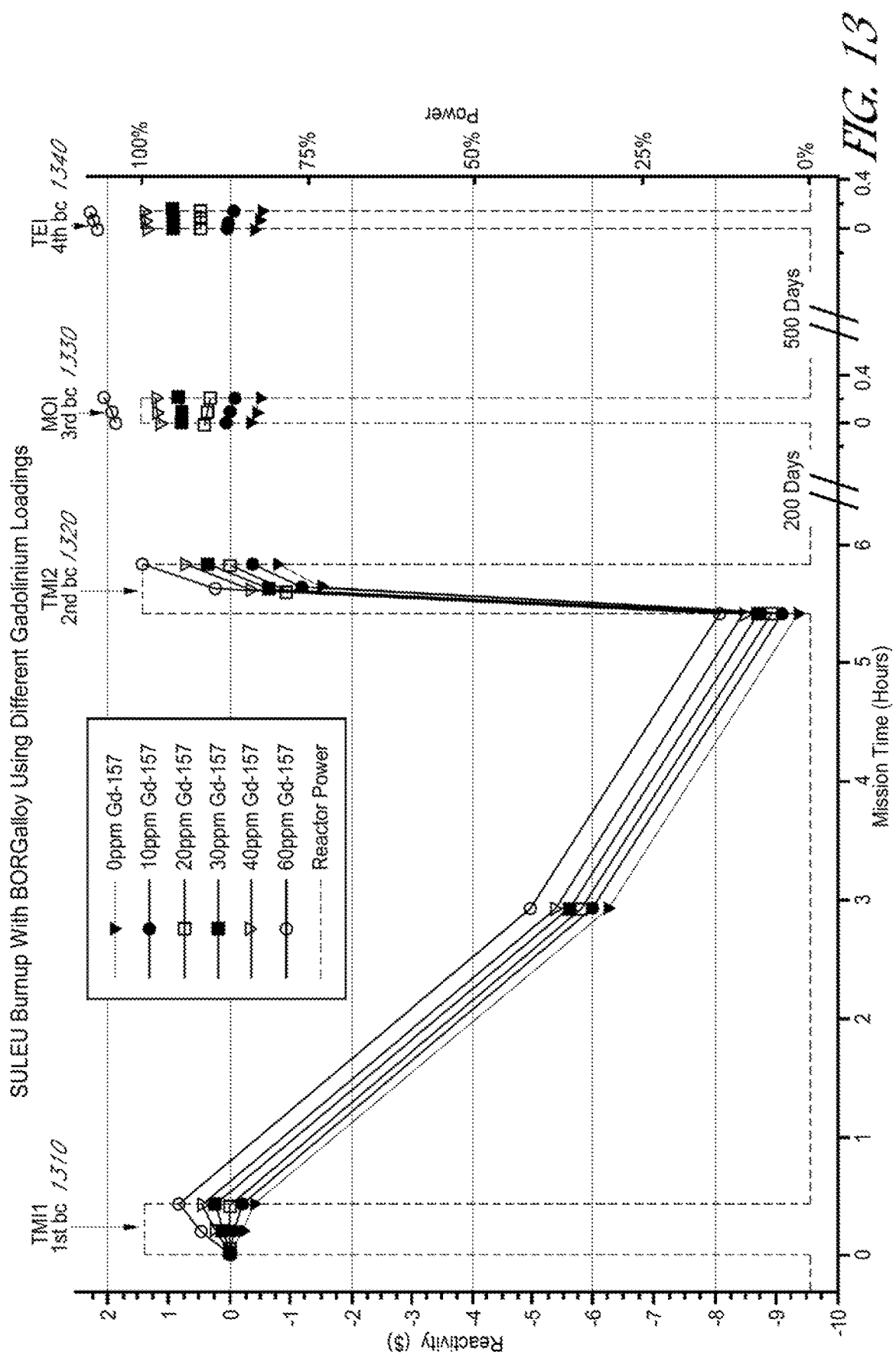
FIG. 13 is a graph of the SULEU core burnup using different gadolinium loadings dispersed in an alloy that forms the outer tie tube layer of the tie tube of FIG. 8 during multiple Trans Martian Injection (TMI) burns.
Figure 14:
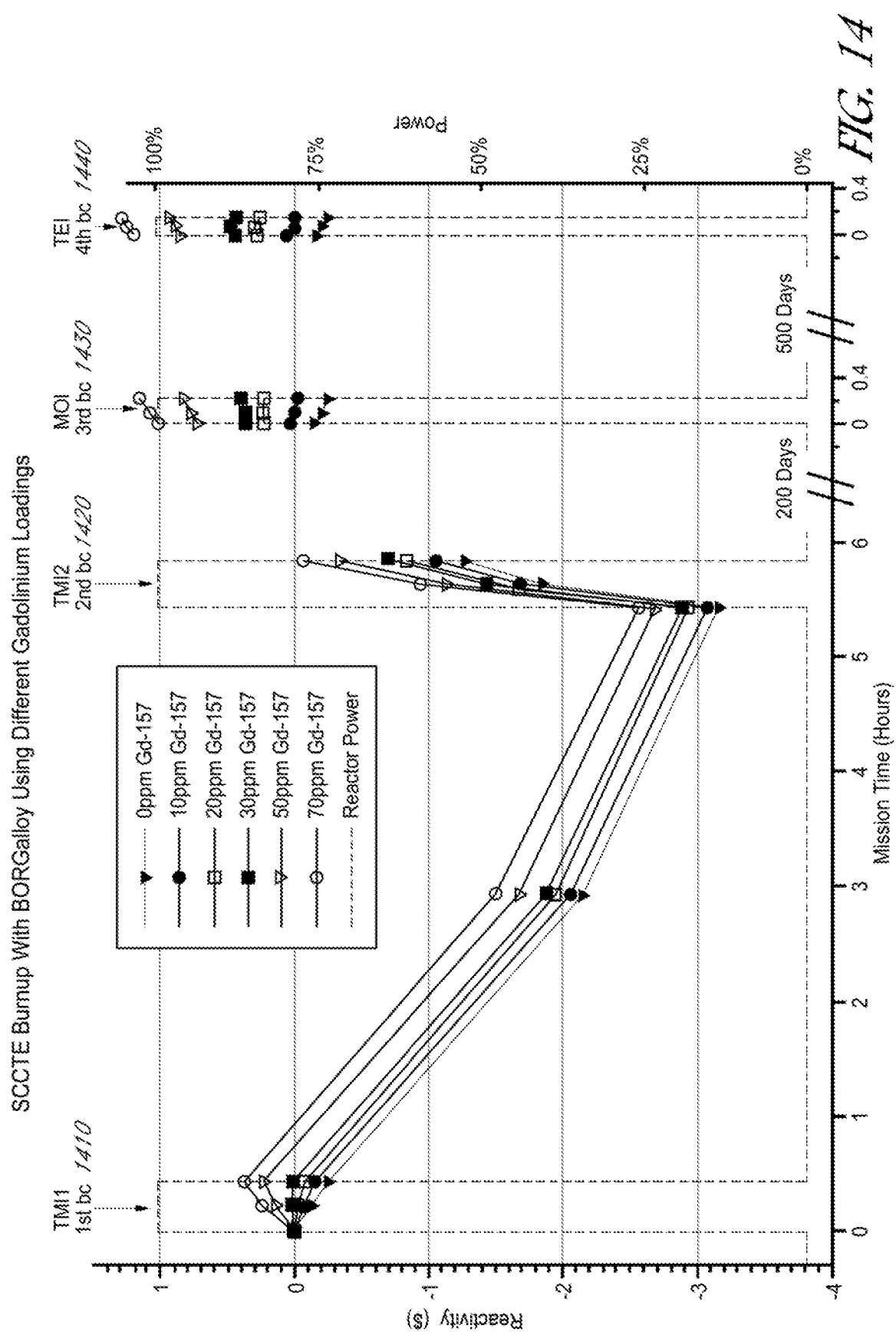
FIG. 14 is a graph of the SCCTE core burnup using different gadolinium loadings dispersed in an alloy that forms the outer tie tube layer of the tie tube of FIG. 8 during multiple TMI burns.

FIG. 13 is a graph of SULEU core burnup using different gadolinium loadings dispersed in an alloy that forms the outer tie tube layer of the tie tube of FIG. 8 during multiple Trans Martian Injection (TMI) burns. FIG. 14 is a graph of SCCTE core burnup using different gadolinium loadings dispersed in an alloy that forms the outer tie tube layer of the tie tube of FIG. 8 during multiple TMI burns.

In order to counter the drop in reactivity found during full power operation due to fuel depletion and fission product accumulation, a burnable neutron poison is introduced into the nuclear reactor core, for example, in an active region of the nuclear reactor core. A burnable neutron poison is an isotope that has a large neutron absorption cross-section that is converted into non neutron-absorbing isotope with the absorption of a neutron. As the neutron poison is depleted, there is a resulting increase in the core reactivity. When done correctly, the amount of the neutron poison is selected or tailored to match the reactivity reduction from the fissile depletion and fission product build-up of the nuclear fuel.

In an example, a BORGalloy (Burnable-poison Operating a Reactor with Gadolinium alloy) is utilized. The burnable poison selected is $^{157}$Gd, which is dispersed in minute quantities in the outer tie tube. The $^{157}$Gd poison is selected because of its extremely high absorption cross-section and its conversion to an isotope that has a comparatively much lower absorption cross-section. In contrast, $^{157}$Gd has a thermal absorption cross-section that it is between 2 and 4 orders of magnitude lower. Although $^{157}$Gd is used in the disclosed examples, it should be understood that other Gd isotopes can be used, including stable isotopes of $^{154}$Gd, $^{155}$Gd, $^{156}$Gd, $^{158}$Gd and $^{160}$Gd, and even less stable isotopes, such as $^{152}$Gd and $^{150}$Gd. It should also be understood that Gd in its natural isotopic composition or an enriched Gd isotope, such as enriched $^{157}$Gd, can be utilized.

When the burnable poison is introduced into the nuclear reactor core such that it has minimal self-shielding (maximum exposure to the core's neutron flux), the burnable poison can be rapidly depleted and result in an appreciable change in reactivity. Additionally, the low self-shielding ensures that the depletion rate remains relatively constant for all burns, removing the need to replace the burnable poison at the beginning of each burn. While poison loaded materials exist in civilian nuclear power, such poison loaded materials are designed to compensate for fissile depletion only and have a much larger poison loading, enhancing self-shielding rather than reducing it.

Various locations were explored including the moderator sleeve of the tie tube, the inner and outer tie tube layers of the tie tube, and the fuel matrix. Of these, the outer tie tube was selected as the location of choice. This is due to the thinness and reduced role of the outer tie tube layer as a structural element when compared with the inner tie tube layer. The thinness of a component (e.g. the outer tie tube layer) reduces the spatial self-shielding of the burnable poison and the lack of need to provide structural support reduces the worry that additions of Gd to the material will reduce its strength below acceptable levels. While the fuel matrix is promising in terms of self-shielding, particularly for a graphite composite matrix, the outer tie tube layer can be preferred in terms of compatibility with existing requirements. For example, introducing Gd into the fuel matrix of each of the fuel elements results in an exponential increase in development costs.

As shown in FIGS. 13 and 14, with the identification of $^{157}$Gd as the burnable poison, it was then implemented into both baseline cores of SULEU and SCCTE to flatten the reactivity profile during full power operation. The results for various Gd loadings are presented in FIGS. 13 and 14 for SULEU and SCCTE, respectively. Through the variation of the Gd content, it is possible to achieve a near flat reactivity change during full power operation for the TMI1, MOI, and TEI for both cores. Specifically, 20 parts per million (ppm) for SULEU and 30 ppm for SCCTE of enriched Gd achieve near flat reactivity profiles for TMI1, MOI, and TEI.

Multiple burn cycles are shown in both FIGS. 13 and 14. More specifically, four burn cycles are shown. The first burn cycle (bc) 1310, 1410 is referred to as the Trans Martian Injection 1 (TMI1) burn; the second burn cycle 1320, 1420 is referred to as the Trans Martian Injection 2 (TMI2) burn; the third burn cycle 1330, 1430 is referred as the Mars Orbital Injection (MOI) burn; and the fourth burn cycle 1340, 1440, is referred to herein as the Trans Earth Injection (TEI) burn.

During the first burn cycle 1310, 1410 (TMI1) that spans a twenty minute period, the NTP system leaves Earth's surface and the reactor is on during which period of time the reactivity is relatively static and xenon builds up. After the initial twenty minute operation period of the first burn cycle 1310, 1410, the reactor is then shut down and the reactivity slowly decreases for a five hour period as a result of xenon decay. During this five hour reactor shutdown period, the NTP system is in an elliptical orbit around the Earth.

During the second burn cycle 1320, 1420 (TMI2) that spans a fifteen minute period, the reactor is then turned back on to enter a Martian intercept orbit to slingshot out of Earth's orbit and towards the Martian intercept orbit at which point a large increase in reactivity is seen. Initially, during the second burn cycle 1320, 1420, there is very rapid depletion of the remaining xenon as a result of the remaining xenon being burned up. As a result of the xenon being burnt up during the second burn cycle 1320, 1420, the reactivity increases significantly towards the end of the second burn cycle and becomes relatively static. After the second burn cycle 1320, 1420, the reactor is powered down and remains off for a 200 day period as the NTP system approaches Mars. During a third burn cycle 1330, 1430 (MOI) after the 200 day Mars approach period, the reactor burns for five minutes to enter Martian orbit.

The reactor is then powered off for a 500 day period in Martian orbit. After 500 days in Martian orbit, the reactor burns for another five minute period during a fourth burn cycle 1340, 1440 (TEI) to leave the Martian orbit and enter a Earth intercept trajectory. Subsequent burn cycles (not shown) can be used to enter a stable Earth orbit and be reused for subsequent missions.

As discussed above, an effect of the use of the Gd burnable poison is an increased change in initial reactivity. This difference is due to the depletion of the poison, which while mitigated somewhat by the depletion of fissile material, can be significant. Without proper mitigation, this can result in the core requiring distinctly different start-up control drum positions that will in turn result in different performance characteristics for each burn. Despite this, the reactivity during all of the burn cycles shown in FIGS. 13 and 14 is generally well controlled and remains relatively static despite the initial accumulation of xenon. By controlling the spatial self-shielding, a linear depletion rate of the Gd neutron poison is attained that matches the production of xenon-135 (stable and meta-stable states) with other fission products and the depletion of the fissile material. The result is that a flat reactivity profile is attained without any operator input, removing the need for radial control drum movement during operation of the burn cycles.

As shown in FIG. 13, towards the end of the five hour reactor shutdown period between the first burn cycle 1310 and second burn cycle 1320, SULEU reaches the lowest reactivity level when the Gd loading is 0 ppm. In contrast, a 60 ppm Gd loading has the highest reactivity towards the end of this five hour reactor shutdown period. During the second burn cycle 1320, a 0 ppm Gd loading results in the lowest reactivity towards the end of the second burn cycle 1320 while a 60 ppm Gd loading provides the highest reactivity. Although a 60 ppm Gd loading has the highest reactivity during the burn cycles 1310, 1320, 1330, and 1340 for SULEU fuel, a 20 ppm Gd loading can be optimal by offering the best compromise level to provide a relatively low reactivity of SULEU fuel during the five hour reactor shutdown period between the first burn cycle 1310 and second burn cycle 1320, yet provide a relatively high reactivity during the first, second, third, and fourth burn cycles 1310, 1320, 1330, and 1340.

As shown in FIG. 14, towards the end of the five hour reactor shutdown period between the first burn cycle 1410 and the second burn cycle 1420, SCCTE reaches the lowest reactivity level when the Gd loading is 0 ppm. In contrast, a 70 ppm Gd loading has the highest reactivity towards the end of this five hour reactor shutdown period. During the second burn cycle 1420, a 0 ppm Gd loading results in the lowest reactivity towards the send of the second burn cycle 1420 while a 70 ppm Gd loading provides the highest reactivity. Although a 70 ppm Gd loading has the highest reactivity during the burn cycles 1410, 1420, 1430, and 1440 for SCCTE fuel, a 30 ppm Gd loading can be optimal by offering the best compromise level to provide a relatively low reactivity of SCCTE fuel during the five hour reactor shutdown period between the first burn cycle 1410 and the second burn cycle 1420, yet provide a relatively high reactivity during the first, second, third, and fourth burn cycles 1410, 1420, 1430, and 1440.

While the effectiveness of the dispersed Gd can deteriorate over time as the Gd is slowly depleted, it has been shown in FIGS. 13-14 that the dispersed Gd is more than able to operate successfully for a manned mission to Mars using NTP.

Variable Hydrogen Density—HYPOSPRA

Figure 15:
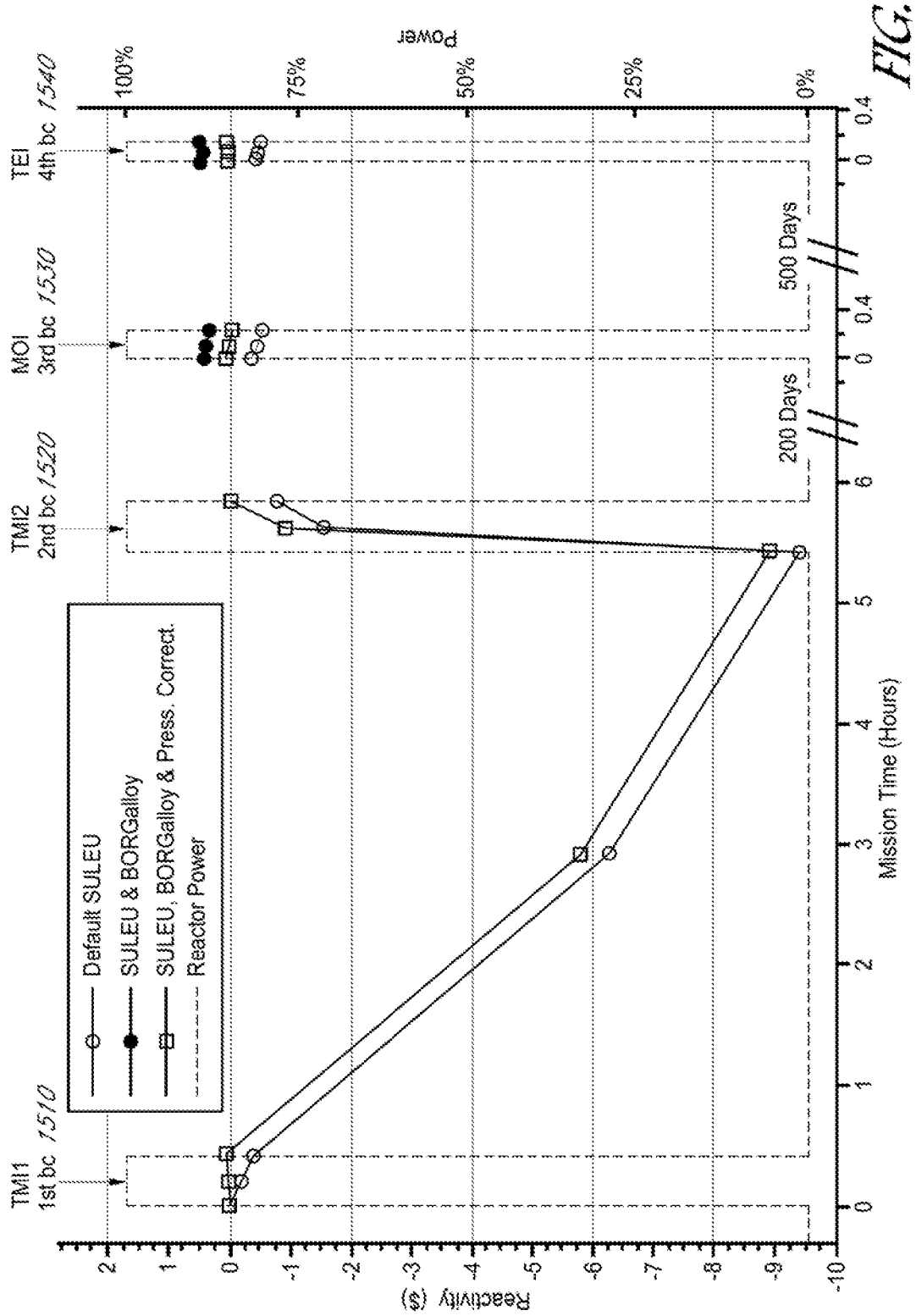
FIG. 15 is a graph of the SULEU core burnup using optimized gadolinium loadings dispersed in an alloy that forms the outer tie tube layer of the tie tube of FIG. 8 and hydrogen pressure correction control by the NTP system of FIGS. 1-2.
Figure 16:
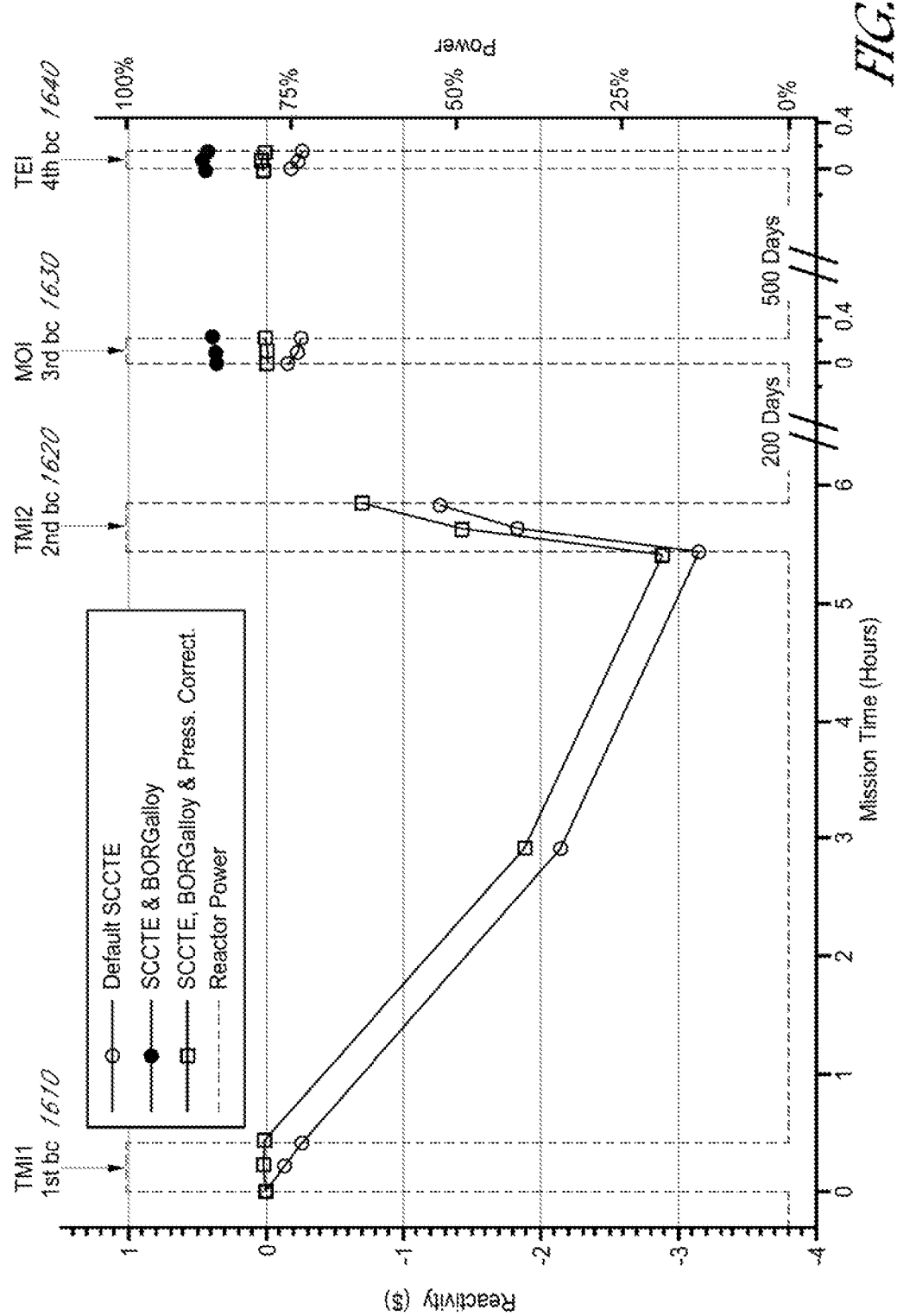
FIG. 16 is a graph of the SCCTE core burnup using optimized gadolinium loadings dispersed in an alloy that forms the outer tie tube layer of the tie tube of FIG. 8 and hydrogen pressure correction control by the NTP system of FIGS. 1-2.

FIG. 15 is a graph of SULEU core burnup using optimized gadolinium loadings dispersed in an alloy that forms the outer tie tube layer of the tie tube of FIG. 8 and hydrogen pressure correction control by the NTP system 100 of FIGS. 1-2. FIG. 16 is a graph of SCCTE core burnup using optimized gadolinium loadings dispersed in an alloy that forms the outer tie tube layer of the tie tube of FIG. 8 and hydrogen pressure correction control by the NTP system 100 of FIGS. 1-2.

To date, NTP reactors (HEU and LEU) have had only one method by which to control the reactivity of the reactor: the radial control drums in the reflector region. As has been previously shown, this is known to result in power peaking changes in the core which are then directly correlated with changes in the exit core temperature and the rocket performance of the system.

However, as demonstrated in FIGS. 15 and 16, adjusting the hydrogen density in the tie tube elements can control the reactivity of the core. In addition, hydrogen density adjustments can be done in combination with Gd loadings.

This reactivity control method effectuated by the NTP system 100 of FIGS. 1-2 works because of two parallel changes to the neutronic environment. First of all, increasing the density reduces radial and axial neutron leakage by acting both as a neutron reflector (axially) and thermalizing the neutron spectrum and reducing the average neutron path length. Second, by thermalizing the neutron spectrum, the fission cross-section of the core is increased, further bringing the average neutron spectrum out of the epithermal region and enhancing the fission to neutron absorption cross-section ratio of the core and enhancing the neutron economy. The combination of these two factors and the fact that the cores are under moderated results in a noticeable reactivity insertion when the hydrogen density is increased uniformly throughout the core and the opposite when it is reduced.

When the hydrogen density is varied in the tie tubes and associated systems by varying percentages from 100% to 200% nominal hydrogen density (equivalent to the same percentages from nominal hydrogen pressures), the reactivity of the core is noticeably increased. The nominal hydrogen pressure can be 5 to 15 megapascals (MPa), and more specifically be 8 MPa. The slope of the line is referred to as the worth of the hydrogen pressure, that is the change in $ of reactivity per change in percent pressure. For the two cores, the hydrogen worth is 0.026 $/% change for SULEU and 0.007 $/% change for SCCTE. These are later reported in FIG. 21.

This propellant density control system can have two unique modes of operation. First, the propellant density control system can be passive in the sense that no operator control is required. Second, the propellant density control system can, alternatively or additionally, be an active reactivity control system that requires an operator to provide input to manually adjust the hydrogen density similar to an operator providing input to manually radially rotate control drums.

The propellant density control system has a valve system that can include an adjustable inlet or outlet valves to actively control hydrogen density in the tie tube, for example, the propellant density control valve system (e.g., element 240 in FIG. 2) of the NTP system 100 shown in FIGS. 1-2. The propellant density control valve system (e.g., element 240 in FIG. 2) provides constant reactivity insertion during each burn. By having a different hydrogen pressure for each burn, the reactivity loss from the depletion of fissile material and, if BORGalloy is implemented, the depletion of the burnable poison, can be compensated for at the beginning of each burn. This means that the starting position for full power operation is made to be consistent for TMI1, MOI, and TEL As a result, an open loop reactor control system as the initial startup position can be made to be consistent for all burns. This can be clearly seen in FIGS. 15 and 16 for SULEU and SCCTE respectively, where the optimized BORGalloy depletions runs have been adjusted by varying the hydrogen pressure and having a consistent initial reactivity.

Multiple burn cycles are shown in both FIGS. 15 and 16. During the first burn cycle 1510, 1610 (TMI1) that spans a twenty minute period, the NTP system leaves Earth's surface and the reactor is on during which period of time the reactivity is relatively static and xenon builds up. After the initial twenty minute operation period of the first burn cycle 1510, 1610, the reactor is then shut down and the reactivity slowly decreases for a five hour period as a result of xenon decay. During this five hour reactor shutdown period, the NTP system is in an elliptical orbit around the Earth.

During a second burn cycle 1520, 1620 (TMI2) that spans a fifteen minute period, the reactor is then turned back on to enter a Martian intercept orbit to slingshot out of Earth's orbit and towards the Martian intercept orbit at which point a large increase in reactivity is seen. Initially, during the second burn cycle 1520, 1620, there is very rapid depletion of the remaining xenon as a result of the remaining xenon being burned up. As a result of the xenon being burnt up during the second burn cycle, 1520, 1620 the reactivity increases significantly towards the end of the second burn cycle 1520, 1620 and becomes relatively static. After the second burn cycle 1520, 1620, the reactor is powered down and remains off for a 200 day period as the NTP system approaches Mars. During a third burn cycle 1530, 1630 (MOI) after the 200 day Mars approach period, the reactor burns for five minutes to enter Martian orbit and land on Mars. As shown, the reactivity is relatively static during the third burn cycle 1530, 1630.

The reactor is then powered off for a 500 day period on the surface of Mars. After 500 days on the surface of Mars, the reactor burns for another five minute period during a fourth burn cycle 1540, 1640 (TEI) to leave the Martian surface and enter Martian elliptical orbit. Subsequent burn cycles (not shown) are used to enter into an Earth intercept trajectory, enter Earth orbit, and land back on Earth.

In FIG. 15, the reactivity profile of SULEU during four burn cycles is plotted using SULEU without any Gd loadings and hydrogen pressure correction (default SULEU). Also plotted is the reactivity profile of SULEU with a Gd loading of 20 ppm (SULEU & BORGalloy). Finally, the reactivity profile of SULEU with a combination of a Gd loading of 20 ppm and hydrogen pressure correction is plotted (SULEU, BORGalloy & Press. Correct.). As shown, the reactivity of SULEU is well controlled and optimal when using the combination of Gd loading and hydrogen pressure correction.

In FIG. 16, the reactivity profile of SCCTE during four burn cycles is plotted using SCCTE without any Gd loadings and hydrogen pressure correction (default SCCTE). Also plotted is the reactivity profile of SCCTE with a Gd loading of 30 ppm (SULEU & BORGalloy). Finally, the reactivity profile of SCCTE with a combination of a Gd loading of 30 ppm and hydrogen pressure correction is plotted (SCCTE, BORGalloy & Press. Correct.). As shown, the reactivity of SCCTE is well controlled and optimal when using the combination of Gd loading and hydrogen pressure correction.

Varying the hydrogen density compensates for the change in reactivity of the nuclear reactor core due to the depletion of fissile material and poisons in the nuclear reactor core without perturbing the radial power profile of the nuclear reactor core. In the example, the hydrogen propellant is introduced into the tie tubes of the nuclear reactor core at different pressures and an empirical measurement of the hydrogen density in the tie tube elements of the nuclear reactor core is made. The nominal hydrogen density is determined to range from 5 to 15 megapascals (MPa), and more specifically 8 MPa. By increasing the hydrogen density, the reactivity is increased and by reducing the hydrogen density the reactivity is decreased. Applying this uniformly to the nuclear reactor core allows for reactivity insertion and removals without changing the power profile of the nuclear reactor core. By adjusting the pressure in the tie tubes of the nuclear reactor core and maintaining a constant pressure during the burn, a constant reactivity insertion that is able to accurately compensate for any change in initial reactivity between burns is achieved.

Accordingly, the moderating capabilities of hydrogen results in a corresponding change in reactivity of the nuclear reactor core when the hydrogen concentration in the nuclear reactor core is changed without affecting radial power distribution of the nuclear reactor core. When combined with other reactivity controls, such as burnable poisons in the nuclear reactor core, the control drum movement can be minimized to the point where control drums are used only for start-up and shut-down and consistently return to the same position. The power cycle of the nuclear reactor core is adapted to allow for variable tie tube hydrogen pressure.

Adjusting Wait Time Between Burn Cycles or Merging Burn Cycles

Figure 17:
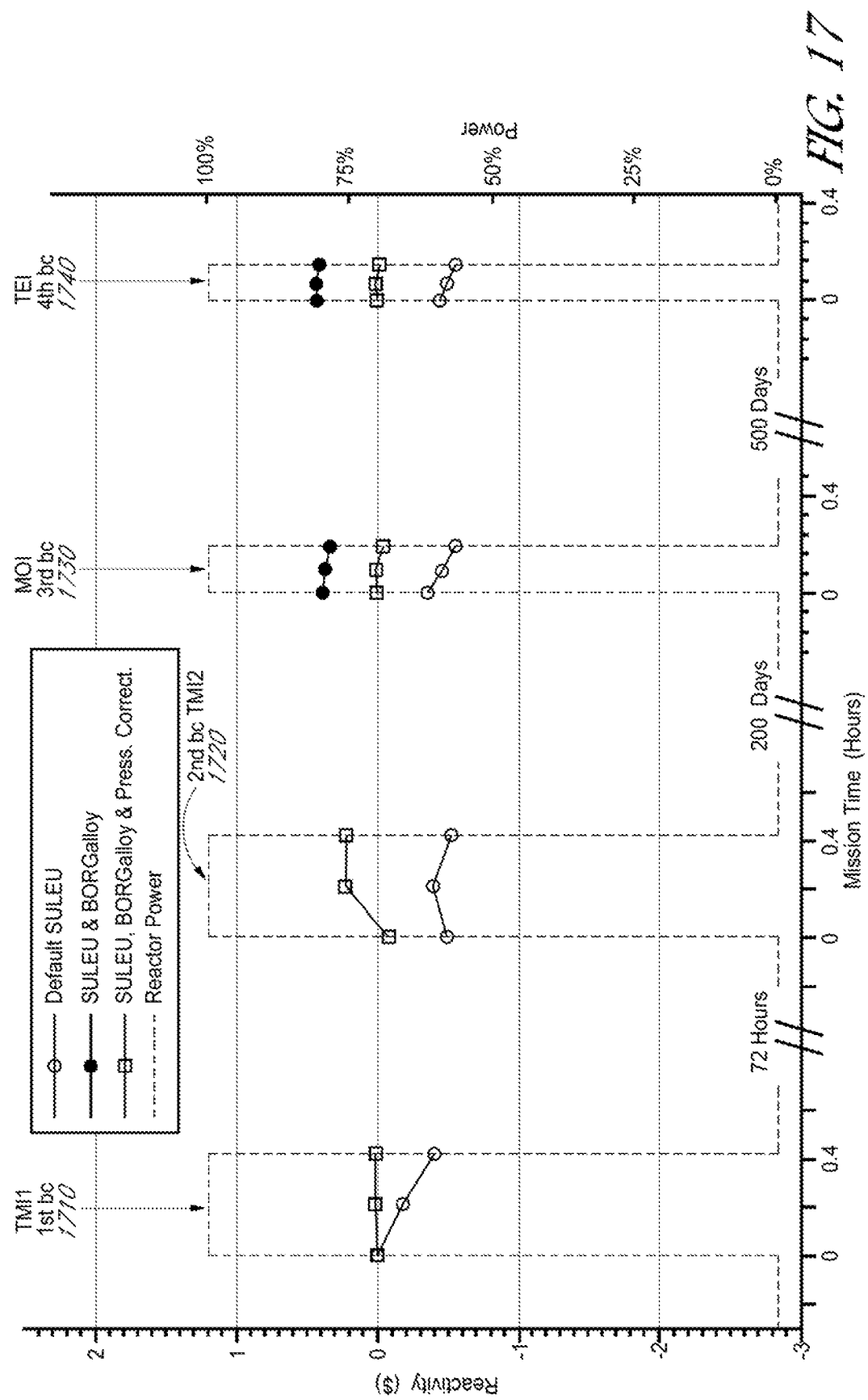
FIG. 17 is a graph of minimum wait time between periods of full-power operation for the SULEU core using optimized gadolinium loadings dispersed in an alloy that forms the outer tie tube layer of the tie tube of FIG. 8 and hydrogen pressure correction control by the NTP system of FIGS. 1-2.
Figure 18:
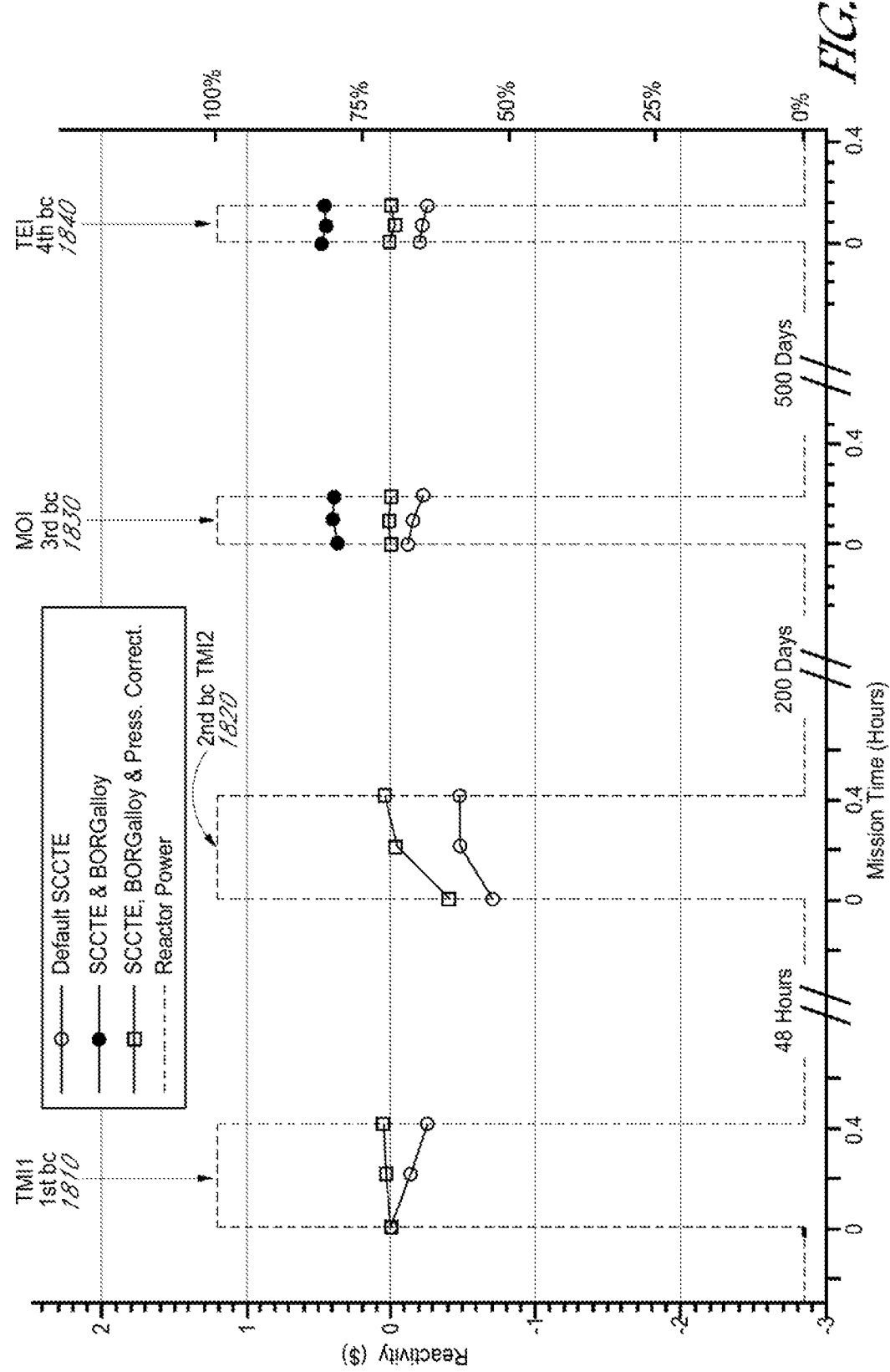
FIG. 18 is a graph of minimum wait time between periods of full-power operation for the SCCTE core using optimized gadolinium loadings dispersed in an alloy that forms the outer tie tube layer of the tie tube of FIG. 8 and hydrogen pressure correction control by the NTP system of FIGS. 1-2.

FIG. 17 is a graph of minimum wait time between periods of full-power operation for the SULEU core using optimized gadolinium loadings dispersed in an alloy that forms the outer tie tube layer of the tie tube of FIG. 8 and hydrogen pressure correction control by the NTP system 100 of FIGS. 1-2. FIG. 18 is a graph of minimum wait time between periods of full-power operation for the SCCTE core using optimized gadolinium loadings dispersed in an alloy that forms the outer tie tube layer of the tie tube of FIG. 8 and hydrogen pressure correction control by the NTP system 100 of FIGS. 1-2.

One method to reduce the effect of xenon on the core reactivity is to increase the wait time between burns or eliminate the second burn. Four burn cycles are shown in both FIGS. 17 and 18 beginning with the TMI1 burn (first burn cycle 1710, 1810). The effect of this can already be seen in the lack of impact the build-up of xenon has on the Mars Orbital Injection (MOI) burn (third burn cycle 1730, 1830) and Trans Earth Injection (TEI) burn (fourth burn cycle 1740, 1840), both of which occur months after the previous burn. In particular, MOI occurs 200 days after the TMI2 burn (second burn cycle 1720, 1820) and TEI occurs 500 days after MOI.

In both of these cases, MOI in the third burn cycle 1730, 1830 and TEI in the fourth burn cycle 1740, 1840, ample time is allowed for the xenon to fully decay away and be absent from the core at start-up. In the current mission profile, however, the TMI2 burn (elements 1320, 1420 in FIGS. 13-14) occurs 5 hours after TMI1 (elements 1310, 1410 in FIGS. 13-14), placing it near the point of highest accumulation of $^{135}$Xe. Consequently, the core has two major issues that need to be resolved. First, it requires a significant positive reactivity insertion in order to be made critical (~$8 for SULEU due to its thermal spectrum and ~$2 for SCCTE). Second, during TMI2 burn (elements 1320, 1420 in FIGS. 13-14) the core undergoes a non-negligible reactivity transient as the xenon is depleted. This transient is an increase in the core reactivity whose rate of increase is directly proportional to the reactor power. Needless to say, this is significantly faster than any desired transient.

To resolve this, it is possible to extend the wait between the two burns as shown in FIGS. 17-18. Ideally, the wait time would be greater than 3 days, the time needed for the xenon to be almost completely decayed away. However, due to the need to minimize time in orbit around the Earth for manned missions (Van Allen radiation belts), the time between the two burns, that is the first burn cycle 1710, 1810 for TMI1 and the second burn cycle 1720, 1820 for TMI2 needs to be minimized. In FIGS. 17 and 18, the minimum wait times between the two burns to achieve a reasonable initial reactivity insertion for start-up and a controllable reactivity transient during operation are identified.

For SULEU fuel, this optimized minimum wait time is a 72 hour time period between the first burn cycle 1710 for TMI1 and the second burn cycle 1720 for TMI2. For SCCTE fuel, the optimized minimum wait time is a 48 hour time period between the first burn cycle 1810 for TMI1 and the second burn cycle 1820 for TMI2. The results of an increased wait from 5 hours to 72 hours between TMI1 and TMI2 is shown in FIG. 17 for SULEU fuel. And FIG. 18 depicts the results of an increased wait from 5 hours to 48 hours between TMI1 and TMI2 for SCCTE fuel.

When compared with FIGS. 15-16, it can be seen that the results are vastly improved using the optimized minimum wait time. The best result in terms of maintaining constant reactivity over subsequent burn cycles and a high sustained reactivity compromise level during burn cycles is attained using a combination of hydrogen pressure correction control, gadolinium (Gd) loading, and minimum wait time features of the NTP system 100 of FIGS. 1-2. When just the combination of Gd loading and minimum wait time are used, the highest reactivity is achieved. Just varying the wait time alone resulted in relatively constant reactivity over subsequent burn cycles.

Control of the minimum wait time between burns is effectuated by the NTP system 100 of FIGS. 1-2 and the NTP system 100 includes a burn cycle controller, such as a computer that includes reactor control software, a digital or analog circuit, a mechanical timer switch, or a combination thereof. For example, the burn cycle controller can be implemented via a digital or analog circuit or software programming instructions stored in a memory that are executed by a processor of the computer that regulate or monitor an adjustable timer circuit or programming instructions and the adjustable timer circuit or programming instructions allow the minimum wait time between burns to be set to a minimum wait time between burns. In response to determining that the minimum wait time between burns has elapsed, the burn cycle controller of the NTP system 100 enables the various components of the NTP system 100 of FIGS. 1-2 to carry out the next burn (i.e., expansion) cycle. If the minimum wait time between burns has not elapsed, the burn cycle controller of the NTP system 100 does not allow the various components of the NTP system 100 of FIGS. 1-2 to carry out the next burn (i.e., expansion) cycle. The burn cycle controller can be overridden by an operator for safety reasons, for example.

Figure 19:
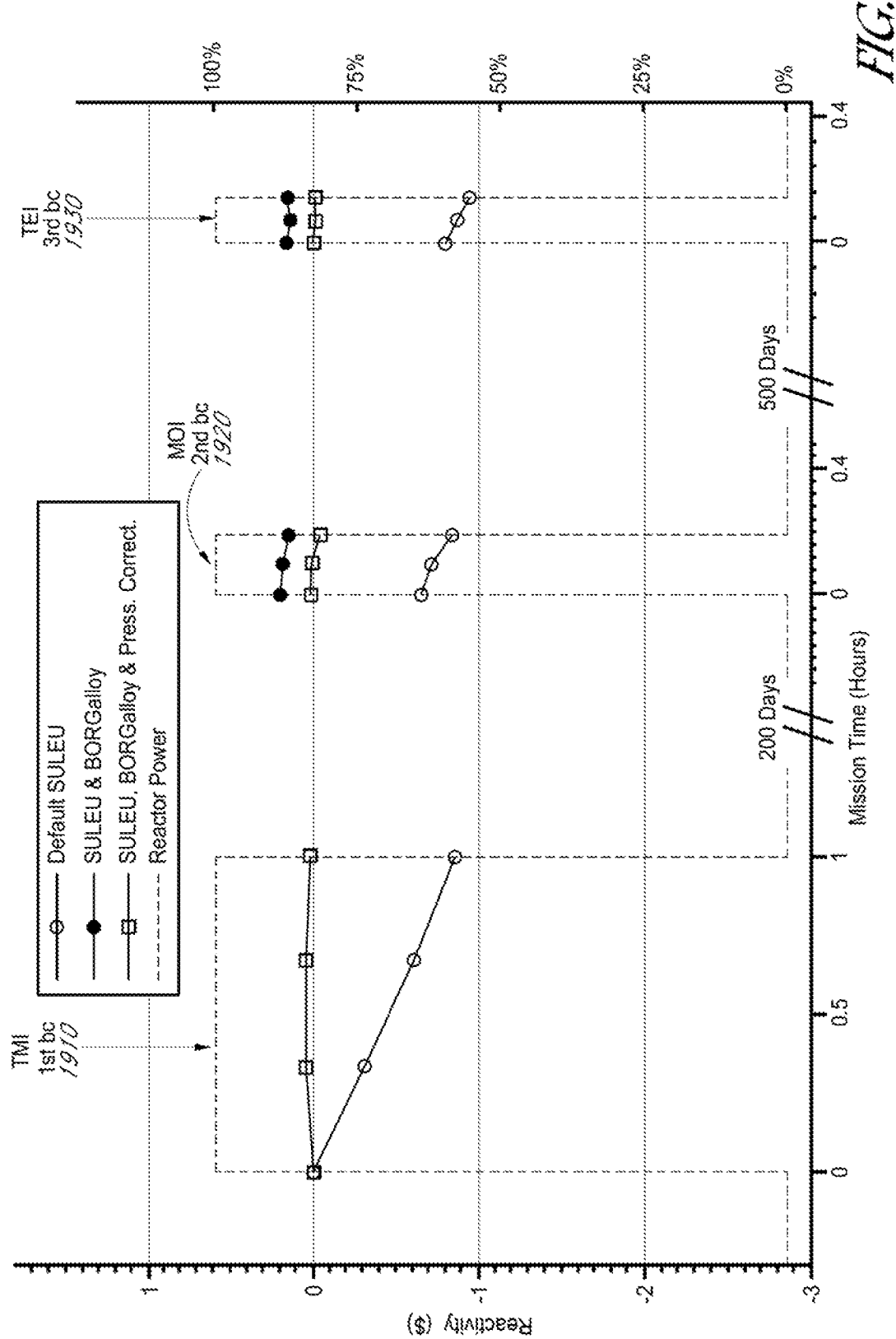
FIG. 19 is a graph of minimum wait time between periods of full-power operation for the SULEU core using optimized gadolinium loadings dispersed in an alloy that forms the outer tie tube layer of the tie tube of FIG. 8 and hydrogen pressure correction control by the NTP system of FIGS. 1-2 in a single Trans Martian Injection (TMI) burn.
Figure 20:
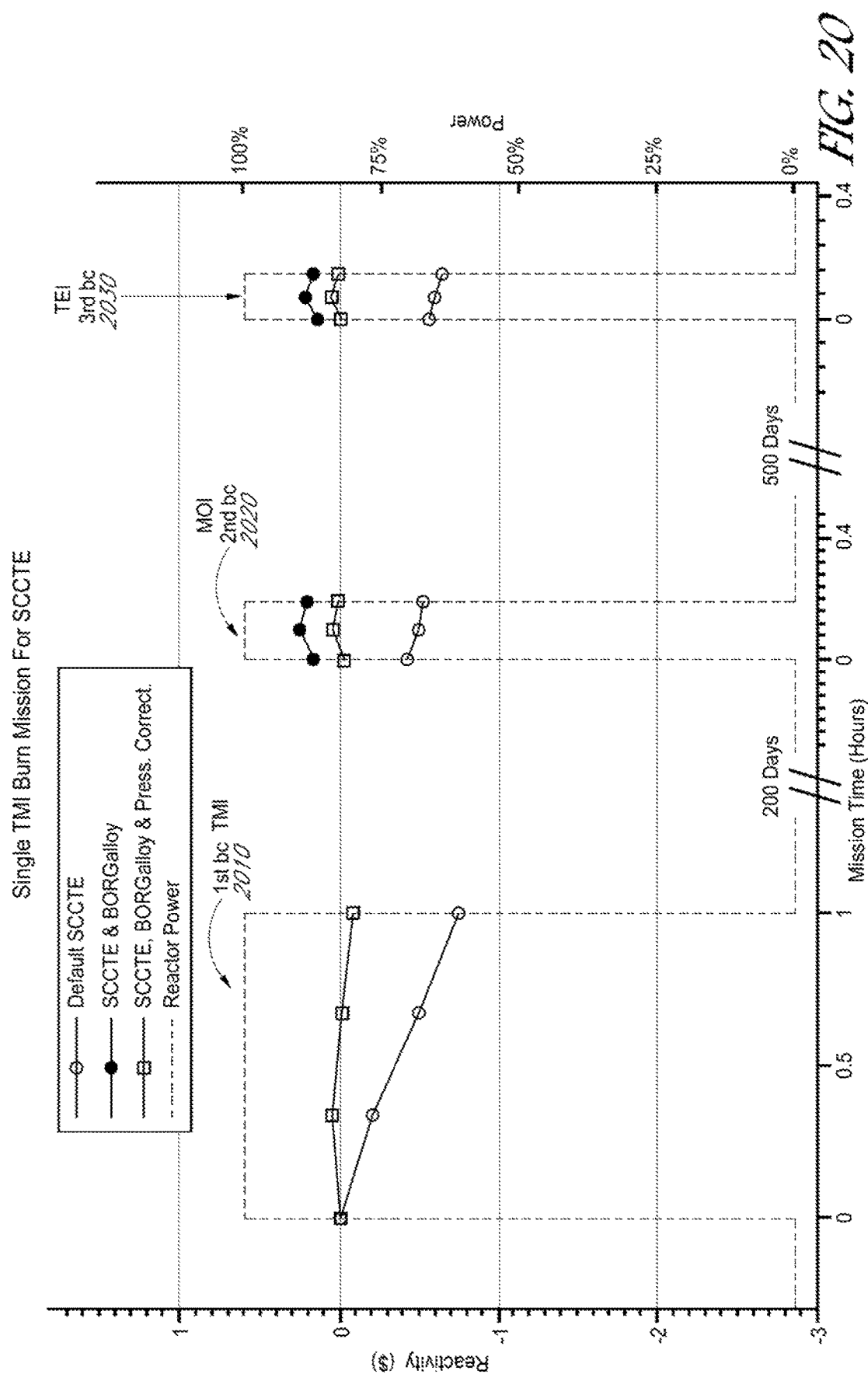
FIG. 20 is a graph of minimum wait time between periods of full-power operation for the SCCTE core using optimized gadolinium loadings dispersed in an alloy that forms the outer tie tube layer of the tie tube of FIG. 8 and hydrogen pressure correction control by the NTP system of FIGS. 1-2 in a single TMI burn.

FIG. 19 is a graph of minimum wait time between periods of full-power operation for the SULEU core using optimized gadolinium loadings dispersed in an alloy that forms the outer tie tube layer of the tie tube of FIG. 8 and hydrogen pressure correction control by the NTP system 100 of FIGS. 1-2 in a single Trans Martian Injection (TMI) burn. FIG. 20 is a graph of minimum wait time between periods of full-power operation for the SCCTE core using optimized gadolinium loadings dispersed in an alloy that forms the outer tie tube layer of the tie tube of FIG. 8 and hydrogen pressure correction control by the NTP system 100 of FIGS. 1-2 in a single TMI burn.

Both FIGS. 19-20 show another approach to resolve the issue of buildup of xenon between TMI1 and TMI2. In the graphs of FIGS. 19-20, the NTP system 100 of FIGS. 1-2, including the burn cycle controller, has adjusted the mission profile control to have a single TMI burn that occurs during the first burn cycle 1910, 2010; MOI during the second burn cycle 1920, 2020; and TEI during the third burn cycle 1930, 2030.

The approach shown is to do a one burn TMI in the first burn cycle 1910, 2010 much like how the TEI is one burn in the third burn cycle 1930, 2030 of FIG. 19-20. However, the length of the single burn cycle for the combined TMI in the first burn cycle 1910, 2010, is longer than the two separate burn cycles that were used previously in the separate TMI1 and TMI2 burns. A one burn TMI 1910, 2010 has a greater gravity loss term than a 2 burn TMI, but it can be seen in FIGS. 19-20 that a one burn TMI significantly reduces the effects of xenon build up. The result of a one burn TMI1 and TMI2 are shown in FIGS. 19 and 20 for SULEU and SCCTE as elements 1910, 2010, respectively.

When compared with FIGS. 15-16, it can be seen that the results are vastly improved using a merged TMI burn cycle (TMI1 and TMI2). As shown, the best result in terms of holding constant reactivity over subsequent burn cycles and a high sustained reactivity compromise level during burn cycles is achieved using a combination of hydrogen pressure correction control, gadolinium (Gd) loading, and the merged TMI burn features of the NTP system 100 of FIGS. 1-2, including the burn cycle controller. When the combination of Gd loading and merged TMI burn cycle are used, the highest reactivity is achieved. Just merging the TMI burn cycle resulted in somewhat constant reactivity over subsequent burn cycles, but not as well as the combination with hydrogen pressure correction control and gadolinium (Gd) loading.

Control of the number and length of burns, for example, of the first burn cycle 1910, 2010 is effectuated by the NTP system 100 of FIGS. 1-2. As noted above, the NTP system 100 of FIGS. 1-2 includes a burn cycle controller, such as a computer that includes reactor control software, a digital or analog circuit, a mechanical timer switch, or a combination thereof. For example, the burn cycle controller allows a mission profile to be set by adjusting the number of burn cycles, a respective length of each of the burn cycles, and a respective shutdown period between each of the burn cycles. The burn cycle controller can be implemented via a digital or analog circuit or software programming instructions stored in a memory that are executed by a processor of the computer that are operable to set a cycle length timer to the length of each burn cycle, set a counter to the number of burn cycles, and set one or multiple shutdown timers to the shutdown period between a number of respective burn cycles.

The burn cycle controller regulates and monitors the number, length of burn cycles, and the shutdown periods that have been set. If the respective burn cycle has not elapsed, the burn cycle controller of the NTP system 100 continues to carry out the respective burn cycle. In response to determining that the respective burn cycle has elapsed, the burn cycle controller of the NTP system 100 disables the various components of the NTP system 100 of FIGS. 1-2. The subsequent burn cycle is carried out after the shutdown period that was previously set between the prior burn cycle and the next burn cycle in the mission profile elapses. Of note, if the minimum wait time between burns has not elapsed as previously described, the burn cycle controller of the NTP system 100 does not allow the various components of the NTP system 100 of FIGS. 1-2 to carry out the next burn (i.e., expansion) cycle. As noted previously, the burn cycle controller can be overridden by an operator for safety reasons, for example.

Temperature Feedback for Simplified Start-Up Procedure

One of the objectives of a passively controlled NTP is to have an open-loop start up sequence. The ultimate goal is to have the operator turn the control drums to a predetermined position, and that the reactor will naturally increase in temperature until it stabilizes at a well-defined temperature without further operator input. An element of closed loop control will still be present as the power is then increased by increasing the propellant coolant flow rate through the core and will require appropriate valving of the rocket as is the case with most modern rocket engines. Hence, the core can have a series of built-in negative reactivity coefficients that as reactor power and temperature increase, the excess reactivity of the core will decrease to the point where a stable temperature is reached.

FIG. 21 is a table of reactivity coefficients for SULEU and SCCTE cores. In the presented reference SULEU and SCCTE cores, with an examination of the fuel and moderator temperature reactivity coefficients, such a start-up sequence can be achieved.

The principal reactivity feedback mechanisms for SULEU and SCCTE are reported in FIG. 21. The enhanced thermal feedback coefficients stem from the fact that LEU-NTP systems have an enhanced fuel temperature feedback from the large fraction of $^{238}U$ in the fuel. With the increase in temperature, the $^{238}U$ undergoes spectrum Doppler broadening and enhances its neutron absorption, resulting in negative reactivity insertion. With this in mind, a moderated LEU-NTP system can be designed with inherent negative feedback to ensure stability at the desired operating temperature. The burn cycle controller discussed above can be operable to directly or indirectly monitor current operating temperature of the nuclear reactor core 110 of the NTP system 100 FIGS. 1-2 to provide temperature feedback, and then adjust the nuclear reactor core 110 during the start-up sequence.

However, the large hydrogen worth of moderated NTP systems can result in unstable systems. While the significant negative reactivity feedback of the fuel helps to significantly mitigate the issue, it does not single handedly resolve the issue. In order to ensure the viability of an open loop start-up sequence, the NTP system can be designed such that the hydrogen density in the tie tubes is sufficiently decoupled from the core power, for example, using the NTP system 100 of FIGS. 1-2. This ensures that the dominant temperature feedback mechanisms for the core are the negative fuel and moderator temperature feedback.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including,"

or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear thermal propulsion system comprising:
a nuclear reactor core including:
an array of fuel elements; and
an array of tie tubes adjacent the array of fuel elements, each tie tube including:
a propellant supply passage to flow a propellant, and
a propellant return passage;
a first propellant density control valve system that includes a first regulator valve between a pump and the tie tubes to regulate density of the propellant flowing through the tie tubes, wherein the propellant flows in series from the pump, through the first regulator valve, then to the tie tubes; and
a second propellant density control valve system that includes a second regulator valve between a turbine and the fuel elements to regulate density of the propellant flowing through the fuel elements, wherein after the tie tubes, the propellant continues to flow in series to the turbine, through the second regulator valve, then to the fuel elements.

2. The nuclear thermal propulsion system of claim 1, wherein the propellant is hydrogen.

3. The nuclear thermal propulsion system of claim 1, wherein:
each tie tube further includes:
an inner tie tube layer surrounding the propellant supply passage,
a moderator sleeve surrounding the inner tie tube layer, and
an outer tie tube layer surrounding the propellant return passage;
the propellant return passage surrounds the moderator sleeve.

4. The nuclear thermal propulsion system of claim 1, further comprising:
a propellant tank to store the propellant;
a nuclear reactor core inlet directly or indirectly connected to the nuclear reactor core;
a propellant line directly or indirectly connected to the propellant tank to flow the propellant to the nuclear reactor core inlet; and
wherein the first propellant density control valve system is directly or indirectly connected between the propellant line and the nuclear reactor core inlet to regulate density of the propellant flowing into the nuclear reactor core.

5. The nuclear thermal propulsion system of claim 4, further comprising:
a turbopump assembly comprising at least one turbopump that includes the turbine and the pump;
wherein the pump is configured to cool the nuclear reactor core during a burn cycle by flowing the propellant from the propellant tank through the propellant line to the first propellant density control valve system, and then through the nuclear reactor core inlet.

6. The nuclear thermal propulsion system of claim 5, wherein:
the nuclear reactor core inlet includes a tie tube inlet to flow the propellant to the array of tie tubes and is directly or indirectly connected to the first propellant density control valve system and a respective propellant supply passage of a respective tie tube in the array of tie tubes; and
the pump is further configured to flow the propellant through the tie tube inlet, through the respective propellant supply passage of the respective tie tube in the array of tie tubes, and then through a respective propellant return passage of the respective tie tube.

7. The nuclear thermal propulsion system of claim 6, further comprising:
a propellant heating line directly or indirectly connected to the turbine and the respective propellant return passage of the respective tie tube; and
wherein:
the second propellant density control valve system is directly or indirectly connected to the turbine and the nuclear reactor core inlet to regulate density of the propellant flowing back to the nuclear reactor core inlet,
the pump is configured to flow the propellant returned by the respective propellant return passage to the turbine via the propellant heating line, and
the turbine is configured to flow the propellant back to the second propellant density control valve system and the nuclear reactor core inlet.

8. The nuclear thermal propulsion system of claim 7, wherein:
the nuclear reactor core inlet further includes a fuel element inlet to flow the propellant to the array of fuel elements and is directly or indirectly connected to the second propellant density control valve system and a respective propellant passage of a respective fuel element of the array of fuel elements; and the turbine is configured to flow the propellant to the second propellant density control valve system, through the fuel element inlet, and then through the respective propellant passage of the respective fuel element of the array of fuel elements.

9. The nuclear thermal propulsion system of claim 5, further comprising:

a pressure vessel housing the nuclear reactor core that is directly or indirectly connected to the first or second propellant density control valve system and including:
  a pressure vessel inlet connected to the periphery of the pressure vessel that is outside of the nuclear reactor core, and
  a pressure vessel outlet to return the propellant passing through the periphery of the pressure vessel; and
a propellant heating line directly or indirectly connected to the turbine and the pressure vessel outlet;
wherein the pump is further configured to flow the propellant to the pressure vessel inlet, through the periphery of the pressure vessel, and then flow the returned propellant from the pressure vessel outlet to the turbine via the propellant heating line.

10. The nuclear thermal propulsion system of claim 9, further comprising:

a nozzle;
a plurality of control drums;
a neutron reflector; and
a third propellant density control valve system directly or indirectly connected between the propellant line and the pressure vessel inlet to regulate density of the propellant flowing into the nozzle, the periphery of the pressure vessel, the neutron reflector, and the plurality of control drums.

11. The nuclear thermal propulsion system of claim 4, wherein the first propellant density control valve system includes:

the first regulator valve to adjust density of the propellant passing through the first regulator valve from an initial density when entering the first regulator valve to a regulated density when exiting the first regulator valve; and
an actuator to actuate the first regulator valve by adjusting the regulated propellant density upwards during each subsequent burn cycle to maintain constant reactivity at a beginning of each of the subsequent burn cycles.

12. The nuclear thermal propulsion system of claim 11, wherein the actuator is electric, mechanical, thermal, magnetic, or a combination thereof.

13. The nuclear thermal propulsion system of claim 12, wherein the first propellant density control valve system further includes a flow control circuit to control speed of the actuator and the flow control circuit is a bleed-off circuit, a meter-out circuit, or a meter-in circuit.

14. The nuclear thermal propulsion system of claim 11, wherein the first regulator valve and the actuator form a solenoid valve or an electrohydraulic servovalve.

15. The nuclear thermal propulsion system of claim 14, wherein the first regulator valve and the actuator form the solenoid valve and the solenoid valve is controlled by electric signals conveyed from an external computer, a digital circuit, an analog circuit, or a combination thereof.

16. The nuclear thermal propulsion system of claim 11, wherein:

the propellant is hydrogen; and
the first regulator valve is configured to adjust density of the hydrogen from the initial density to the regulated density by varying pressure between 100% and 200% of nominal hydrogen pressure, inclusive, to increase reactivity of the nuclear reactor core.

17. The nuclear thermal propulsion system of claim 16, wherein the nominal hydrogen pressure is 5 to 15 megapascals (MPa).

18. A nuclear thermal propulsion system comprising:

a nuclear reactor core including fuel elements and tie tubes;
a propellant tank to store a propellant;
a nuclear reactor core inlet directly or indirectly connected to the nuclear reactor core;
a propellant line directly or indirectly connected to the propellant tank to flow the propellant to the nuclear reactor core inlet; and
a first propellant density control valve system that includes a first regulator valve between a pump and the tie tubes to regulate density of the propellant flowing through the tie tubes, wherein the propellant flows in series from the pump, through the first regulator valve, then to the tie tubes; and
a second propellant density control valve system that includes a second regulator valve between a turbine and the fuel elements to regulate density of the propellant flowing through the fuel elements, wherein after the tie tubes, the propellant continues to flow in series to the turbine, through the second regulator valve, then to the fuel elements.

19. The nuclear thermal propulsion system of claim 18, further comprising:

a turbopump assembly comprising at least one turbopump that includes the turbine and the pump;
wherein the pump is configured to cool the nuclear reactor core during a burn cycle by flowing the propellant from the propellant tank through the propellant line to the first propellant density control valve system, and then through the nuclear reactor core inlet.

20. The nuclear thermal propulsion system of claim 19, wherein:

the nuclear reactor core inlet includes a tie tube inlet to flow the propellant to the tie tubes and is directly or indirectly connected to the first propellant density control valve system and a respective propellant supply passage of a respective tie tube; and
the pump is further configured to flow the propellant through the tie tube inlet, through the respective propellant supply passage of the respective tie tube, and then through a respective propellant return passage of the respective tie tube.

* * * * *